United States Patent
Yoshioka

(10) Patent No.: US 7,918,085 B2
(45) Date of Patent: Apr. 5, 2011

(54) FUEL-INJECTION CONTROL DEVICE FOR INTERNAL-COMBUSTION ENGINE

(75) Inventor: Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 928 days.

(21) Appl. No.: 11/793,039

(22) PCT Filed: Dec. 27, 2005

(86) PCT No.: PCT/JP2005/024226
§ 371 (c)(1),
(2), (4) Date: Jun. 15, 2007

(87) PCT Pub. No.: WO2006/075537
PCT Pub. Date: Jul. 20, 2006

(65) Prior Publication Data
US 2008/0097680 A1   Apr. 24, 2008

(30) Foreign Application Priority Data
Jan. 12, 2005 (JP) .................... 2005-005026

(51) Int. Cl.
*F01N 3/00* (2006.01)
*F02B 27/04* (2006.01)
(52) U.S. Cl. ............... 60/286; 60/276; 60/274; 60/277
(58) Field of Classification Search .............. 60/285, 60/286, 273, 274, 277
See application file for complete search history.

(56) References Cited

U.S. PATENT DOCUMENTS
2002/0152743 A1 * 10/2002 Nakamura .............. 60/285
2003/0159434 A1    8/2003 Ikemoto et al.

FOREIGN PATENT DOCUMENTS
| FR | 2 844 007 | 3/2004 |
| JP | A-7-103033 | 4/1995 |
| JP | A 11-101150 | 4/1999 |
| JP | A 2003-172176 | 6/2003 |
| JP | A 2003-254130 | 9/2003 |
| JP | A 2003-278519 | 10/2003 |

* cited by examiner

*Primary Examiner* — Thomas E Denion
*Assistant Examiner* — Michael Carton
(74) *Attorney, Agent, or Firm* — Oliff & Berridge, PLC

(57) ABSTRACT

A fuel injection control device performs fuel injection only once corresponding to an over-rich air/fuel ratio immediately after the end of F/C as rich air/fuel ratio control after F/C. Such fuel injection is performed with a fuel amount which is the sum of a fuel amount corresponding to a shallow rich air/fuel ratio AFrich and a predetermined increment. Immediately after this operation, fuel injection is performed with a fuel amount corresponding to the shallow rich air/fuel ratio AFrich. This adjusts the air/fuel ratio of the engine to the over-rich air/fuel ratio for an extremely short period of time immediately after the end of F/C, following which the air/fuel ratio is immediately switched to the shallow rich air/fuel ratio AFrich.

6 Claims, 16 Drawing Sheets

FUEL-INJECTION CONTROL DEVICE FOR INTERNAL-COMBUSTION ENGINE

TECHNICAL FIELD

The present invention relates to a fuel-injection control device for an internal-combustion engine, and particularly to a fuel-injection control device having a function of controlling the operation at a rich air/fuel ratio after fuel cut, as well as a function of the fuel cut corresponding to the operation of the internal-combustion engine.

BACKGROUND ART

Conventionally, arrangements are known in which a three way catalyst (which will simply be referred to as "catalyst" in this specification, as well) is provided to an exhaust path of the internal-combustion engine for detoxifying exhaust from the internal-combustion engine. The three way catalyst has a function (oxidation function) of oxidizing unburned components (HC, CO) in the exhaust flowing therethrough, as well as a function (reduction function) of reducing nitrogen oxides (NOx) in the exhaust, thereby detoxifying harmful emissions such as HC and CO, which are unburned components, NOx, and so forth.

Furthermore, in general, the three way catalyst has an oxygen adsorption function ($O_2$ storage function) for adsorbing (storing) oxygen. Specifically, in a case that exhaust flows through the three way catalyst at a richer air/fuel ratio than the theoretical air/fuel ratio, the three way catalyst oxidizes the unburned components such as HC, CO, and so forth, contained in the exhaust using oxygen stored therein (i.e., discharge oxygen). On the other hand, in a case that exhaust flows through the three way catalyst at a leaner air/fuel ratio than the theoretical air/fuel ratio, the three way catalyst reduces oxygen and $NO_x$ contained in the exhaust and stores the oxygen, captured in the reduction, therein. This oxygen adsorption function enables effective detoxification of HC and CO, which are unburned components, and $NO_x$, over a range of air/fuel ratios around the theoretical air/fuel combustion ratio of the exhaust of the exhaust flowing through the three way catalyst around the theoretical air/fuel combustion ratio.

With such an arrangement, in order to maintain satisfactory oxygen adsorption function over the range of the air/fuel ratio around the theoretical air/fuel ratio from a certain lean air/fuel ratio up to a certain rich air/fuel ratio, the amount of oxygen adsorbed on the catalysis (oxygen adsorption amount) is preferably kept around a predetermined suitable amount, e.g., around half of the maximum oxygen amount which the catalysis can absorb (maximum oxygen adsorption capacity).

Recently, internal-combustion engines are known having a function of performing operation without fuel injection (fuel cut) depending on the operation thereof, e.g., in a case that the driver releases the accelerator pedal during driving of the vehicle, and so forth, thereby improving the fuel efficiency. With such internal-combustion engines, exhaust flowing through the catalysis includes only air during the fuel cut operation. That is to say, in this case, exhaust continuously flows through the catalysis at an extremely lean air/fuel ratio. Note that the fuel cut operation will also be referred to as "F/C" hereafter.

This often increases the oxygen adsorption amount of the catalysis up to the maximum adsorption amount thereof at the point in time after F/C (i.e., the start point of fuel injection (combustion)). In this state, the catalysis cannot exhibit satisfactory oxygen adsorption performance, leading to difficulty in efficient detoxification of $NO_x$ in the exhaust.

In order to solve the aforementioned problems, a technique is known in which the flow of the exhaust passing through the catalysis (i.e., the flow of mixture supplied to the engine) is temporarily adjusted to a rich air/fuel ratio after F/C, thereby controlling the oxygen adsorption amount of the catalysis around the aforementioned suitable amount. Such operation will also be referred to as "rich air/fuel ratio control after F/C" hereafter. On the other hand, the air/fuel ratio supplied to the engine will also be referred to as "air/fuel ratio of the engine" hereafter.

For example, with a fuel-injection control device (fuel supply control device) which has a function of the rich air/fuel ratio control after F/C, and which has been disclosed in Japanese Unexamined Patent Application Publication No. 2003-172176, the operation of the engine is performed while gradually reducing the air/fuel ratio from a richer air/fuel ratio than the theoretical air/fuel ratio by a predetermined amount after F/C up to the theoretical air/fuel ratio over time after the end of F/C.

FIG. 17 shows an example of change in the air/fuel ratio of the engine over the period of time including the rich air/fuel ratio control after F/C, performed by the fuel-injection control device disclosed in the above-described Document. Specifically, the drawing shows an example in which the air/fuel ratio of the engine is controlled to the theoretical air/fuel ratio (stoichiometric ratio) before the point in time t1 at which F/C begins. Subsequently, in this example, F/C is executed from the point in time t1 up to the point in time t2.

In this case, the rich air/fuel ratio control after F/C is executed over the time from the point in time t2 which is the end point of F/C up to the point in time t3. This adjusts the air/fuel ratio of the engine to a level richer than the stoichiometric ratio by a predetermined amount after the point in time t2. Subsequently, the air/fuel ratio is gradually reduced so as to approach the stoichiometric ratio over the following time. Eventually, the air/fuel ratio of the engine is adjusted to the stoichiometric ratio after the point in time t3.

On the other hand, the air/fuel ratio of the engine somewhat greater than the theoretical air/fuel ratio provides the maximum output of the engine. Furthermore, a relation is known according to which, as the air/fuel ratio of the engine is richer than the theoretical air/fuel ratio of the engine, the output of the engine becomes gradually smaller. Accordingly, control of the air/fuel ratio to a considerable rich air/fuel ratio as compared with the theoretical air/fuel ratio for a considerably long duration leads to the user experiencing sensation that a desired output cannot be obtained (which will also be referred to as "lag sensation" hereafter). Here, an excessively rich air/fuel ratio that causes apparently reduced output of the engine which leads to the driver experiencing lag sensation will also be referred to as "over-rich air/fuel ratio" hereafter.

Accordingly, in order to perform operation without driver experiencing such a lag sensation due to the rich air/fuel ratio control after F/C, control of the air/fuel ratio of the engine to such an over-rich air/fuel ratio for a relatively long period of time should be prevented.

On the other hand, it has come to be known that in a case of maintaining the operation of the engine at a shallow rich air/fuel ratio leaner than the over-rich air/fuel ratio (i.e., at a rich air/fuel ratio at which the operation of the engine for a relatively long duration does not leads to the driver experiencing lag sensation) during the rich air/fuel ratio control after F/C, the catalysis cannot provide sufficient detoxification of $NO_x$ in the exhaust flowing therethrough over an extremely short period of time immediately after the end of F/C, leading to a problem that a relatively large amount of NOx passing through the catalysis without detoxification. It is thought that such a phenomenon occurs due to insufficient region of the catalysis which can exhibit the aforementioned reduction function (which will be referred to as "reducing region" hereafter) during an extremely short period of time immediately after F/C.

Furthermore, it has come to be known that such a phenomenon can be avoided by operating the engine at an over-rich air/fuel ratio immediately after the end of F/C. It is thought that the reason is that the operation of the engine at an over-rich air/fuel ratio provides a sufficient area of the reducing region in an extremely short period of time immediately after F/C (detailed description will be made later).

Now, let us consider an arrangement in which the fuel-injection control device disclosed in the aforementioned document controls rich air/fuel ratio control after F/C at an over-rich air/fuel ratio immediately after the end of F/C. Here, let us say that an air/fuel ratio which is richer than the value AFrich is an over-rich air/fuel ratio as shown in FIG. 17. In this case, the operation of the engine is controlled at an over-rich air/fuel ratio over a relatively long period of time from the point in time t2 up to the point in time tA (see the hatched region in FIG. 17).

Accordingly, the fuel-injection control device disclosed in the aforementioned document has a problem that the rich air/fuel ratio control after F/C sufficient for preventing $NO_x$ from being discharged even over an extremely short period of time immediately after the end of F/C leads to the aforementioned phenomenon involving the user's lag sensation.

DISCLOSURE OF INVENTION

The present invention has been made in order to solve the aforementioned problems. Accordingly, it is an object thereof to provide a fuel-injection control device for an internal combustion engine having a function of rich air/fuel ratio control after F/C for efficiently suppressing $NO_x$ from passing through the catalysis without involving the driver experiencing lag sensation.

A fuel injection control device according to the present invention is applied to an internal-combustion engine including fuel injection means (e.g., injector) for injecting fuel into a combustion chamber, and a catalysis (three way catalyst) provided to an exhaust path of the internal-combustion engine.

The fuel injection control device according to the present invention includes: fuel cut processing executing means for performing F/C corresponding to the operation state of the internal-combustion engine; and post-fuel-cut-processing rich air/fuel ratio control means for performing the aforementioned rich air/fuel ratio control after F/C following the F/C processing.

With the present invention, the post-fuel-cut-processing rich air/fuel ratio control means adjusts the fuel amount injected from said fuel injecting means such that the air/fuel ratio of the gas flowing into said catalysis is adjusted to a first rich air/fuel ratio during a predetermined short period of time alone from the end of said fuel cut processing, following which said air/fuel ratio is switched to a second rich air/fuel ratio after said short period of time. Here, said first rich air/fuel ratio is a rich air/fuel ratio which greatly deviates from the theoretical air/fuel ratio and which leads to apparent reduction in the output of said engine. On the other hand, said second rich air/fuel ratio is a rich air/fuel ratio which somewhat deviates from the theoretical air/fuel ratio and which does not lead to apparent reduction in the output of said engine. (that is, the first rich air/fuel ratio is richer than the second rich air/fuel ratio which is richer than the theoretical air/fuel ratio)

Here, the term "apparent reduction in the output of said engine" means that the reduction in the output for a relatively long period of time leads to the driver experiencing lag sensation (as compared with the operation at the theoretical air/fuel ratio). That is to say, the aforementioned first rich air/fuel ratio corresponds to a deep rich air/fuel ratio (i.e., the aforementioned over-rich air/fuel ratio) at which the operation for a relatively long period of time leads to the driver experiencing lag sensation. On the other hand, the aforementioned second rich air/fuel ratio corresponds to a shallow rich air/fuel ratio at which the operation for a relatively long period of time does not lead to the driver experiencing lag sensation.

Note that each of the first rich air/fuel ratio and the second rich air/fuel ratio may be a fixed value, or may be a variable adjusted over time. Furthermore, as the first rich air/fuel ratio, an air/fuel ratio which is less than 11 is employed, for example. On the other hand, as the second rich air/fuel ratio, an air/fuel ratio which is equal to or greater than 11 and less than the theoretical air/fuel ratio (e.g., 14.6) is employed.

With the aforementioned arrangement, in the normal operation, the fuel injection amount is adjusted such that the air/fuel ratio of gas flowing into the catalysis (i.e., air/fuel ratio of the engine) matches the theoretical air/furl ratio. In this case, an arrangement may be made in which a fuel amount (basic fuel injection amount) necessary for the theoretical air/fuel ratio is calculated based upon the cylinder intake-air amount, and fuel injection is performed with the basic fuel injection amount thus obtained. Also, an arrangement may be made in which the fuel injection amount is calculated by correcting the aforementioned basic fuel injection amount thus obtained, by air/fuel ratio feedback control performed based upon the output of the air/fuel ratio sensor provided to the exhaust path downstream of the catalysis, and fuel injection is performed with the fuel injection amount thus obtained.

On the other hand, in a case that a predetermined F/C execution condition is satisfied corresponding to the operation state of the engine, F/C is executed. Then, after the end of F/C, rich air/fuel ratio control after F/C is executed. In this case, the air/fuel ratio of gas flowing into the catalysis (accordingly, the air/fuel ratio of the engine) is adjusted to an over-rich air/fuel ratio (deep rich air/fuel ratio) only during a predetermined short period of time from the end of F/C. Subsequently, the air/fuel ratio is immediately switched to a leaner rich air/fuel ratio (shallow rich air/fuel ratio) than the over-rich air/fuel ratio. That is to say, the air/fuel ratio of the engine is controlled in a two-stage manner.

Thus, the air/fuel ratio is adjusted to such an over-rich air/fuel ratio which is a first rich air/fuel ratio during the aforementioned short period of time. This provides the operation without involving the driver experiencing lag sensation. Furthermore, the air/fuel ratio of the engine is adjusted to such an over-rich air/fuel ratio immediately after the end of F/C. This allows a sufficient area of the reducing region in the catalysis to be prepared in an extremely short period of time immediately after the end of F/C. This prevents $NO_x$ from flowing out over such an extremely short period of time immediately after the end of F/C. Thus, the present invention effectively prevents $NO_x$ from flowing out from the catalysis without involving the driver experiencing lag sensation.

Description has been made regarding an arrangement in which the air/fuel ratio of gas flowing into the catalysis is controlled by adjusting the fuel injection amount supplied from the aforementioned fuel injection means for combustion in the combustion chamber during the rich air/fuel ratio control after F/C. Also, an arrangement may be made in which the air/fuel ratio is controlled by adjusting the fuel injection amount supplied from a second fuel injecting means (injector or the like) for injecting fuel (or reducing agent) into an exhaust path (or catalysis) provided to the exhaust path upstream of the catalysis.

Also, the fuel injection amount for adjusting the air/fuel ratio of gas flowing into the catalysis to the first rich air/fuel ratio may be set to a value which is the sum of the fuel injection amount necessary for adjusting the air/fuel ratio of gas flowing into the catalysis to the second rich air/fuel ratio (i.e., fuel amount necessary for the second rich air/fuel ratio calculated based upon the cylinder intake-air amount) and a predetermined increment.

Such an increment may be determined, independent of the cylinder intake-air amount (i.e., the increment may be a so-called asynchronous injection amount). In this case, the air/fuel ratio of gas flowing into the catalysis is a richer air/fuel ratio than the second rich air/fuel ratio by such an increment. That is to say, the air/fuel ratio thus obtained is employed as the first rich air/fuel ratio.

On the other hand, the air/fuel ratio is preferably adjusted to the second rich air/fuel ratio during a period of time following the end of F/C until the oxygen adsorption amount of the catalysis is reduced from the maximum oxygen adsorption amount up to an amount which allows effective detoxification of $NO_x$ contained in exhaust at a leaner air/fuel ratio than the theoretical air/fuel ratio after the rich air/fuel ratio control after F/C, e.g., until the oxygen adsorption amount of the catalysis is reduced from the maximum oxygen adsorption amount to around half of the maximum oxygen adsorption amount. Note that the oxygen adsorption amount of the catalysis can be estimated using known techniques (e.g., techniques described later).

The fuel injection control device according to the present invention preferably further includes index-value acquisition means for acquiring an oxygen adsorption capacity index value which represents the degree of the oxygen adsorption capacity of the aforementioned catalysis. Furthermore, the aforementioned post-fuel-cut-processing rich air/fuel ratio control means preferably determines the aforementioned first rich air/fuel ratio based upon the aforementioned oxygen adsorption capacity index value thus obtained such that the greater the oxygen adsorption capacity of the catalysis is, the richer the first rich air/fuel ratio is.

Here, the term "the degree of the oxygen adsorption capacity of the catalysis" means the degree of adsorption/release reaction of oxygen due to the oxygen adsorption properties of the catalysis (reaction speed of adsorption/release of oxygen, i.e., the oxygen amount which the catalysis can store/release per unit time and per unit volume). The oxygen adsorption capacity index value, which represents the degree of the oxygen adsorption capacity of the catalysis, preferably changes corresponding to the deterioration index value which indicates the degree of deterioration in the catalysis, or the temperature of the catalysis. The reason is that the oxygen adsorption capacity of the catalysis decreases due to deterioration in the catalysis. Furthermore, the oxygen adsorption capacity of the catalysis changes corresponding to the temperature thereof.

Also, the maximum oxygen adsorption amount of the catalysis is preferably employed as the aforementioned deterioration index value. The reason is that the greater the deterioration in the catalysis is, the smaller the maximum oxygen adsorption amount of the catalysis is. In addition, the maximum oxygen adsorption amount of the catalysis can be obtained relatively easily using known techniques.

Let us consider a case in which the air/fuel ratio of the engine is adjusted to an over-rich air/fuel ratio immediately after the end of F/C. In this case, in general, the higher the oxygen adsorption capacity of the catalysis is, the smaller the reducing region prepared in the catalysis in an extremely short period of time immediately after the end of F/C is (detailed description will be made later). Also, in this case, in general, the richer the over-rich air/fuel ratio thus set is, the larger the reducing region prepared in the catalysis in an extremely short period of time immediately after the end of F/C is (detailed description will be made later).

Accordingly, an arrangement in which the first rich air/fuel ratio (i.e., the over-rich air/fuel ratio) is adjusted such that the greater the oxygen adsorption capacity of the catalysis is, the richer the air/fuel ratio is, as described above, allows a sufficient area of the reducing region in the catalysis to be prepared in an extremely short period of time immediately after the end of F/C, regardless of the oxygen adsorption capacity of the catalysis. Thus, such an arrangement has the advantage of preventing $NO_x$ from flowing out over such an extremely short period of time immediately after the end of F/C in a stable manner, regardless of the oxygen adsorption capacity of the catalysis.

Now, as described above, let us consider an arrangement in which the fuel injection amount for adjusting the air/fuel ratio of gas flowing into the catalysis to the first rich air/fuel ratio is set to a value which is the sum of the fuel injection amount for adjusting the air/fuel ratio of gas flowing into the catalysis to the second rich air/fuel ratio and a predetermined increment. With such an arrangement, the aforementioned increment is determined such that the greater the oxygen adsorption capacity (e.g., maximum oxygen adsorption amount) of the catalysis is, the greater the aforementioned increment is.

With the fuel injection control device according to the present invention, the aforementioned post-fuel-cut-processing rich air/fuel ratio control means preferably controls the fuel amount injected from the fuel injecting means such that the fuel injection corresponding to the first rich air/fuel ratio is performed only once.

With such an arrangement, the air/fuel ratio of gas flowing into the catalysis (accordingly, the air/fuel ratio of the engine) is adjusted to an over-rich air/fuel ratio during a period of time (i.e., the aforementioned predetermined short period of time) which is a period of time corresponding to one-time fuel injection, i.e., during an extremely short period of time. Thus, such an arrangement prevents the driver experiencing lag sensation in a sure manner since the period of time during which the air/fuel ratio is adjusted to the over-rich air/fuel ratio is extremely short.

Also, with the fuel injection control device according to the present invention, the post-fuel-cut-processing rich air/fuel ratio control means may have a configuration in which the fuel amount injected from the fuel injecting means is adjusted such that fuel injection corresponding to the first rich air/fuel ratio is performed multiple times.

With the above-described arrangement in which fuel injection corresponding to the first rich air/fuel ratio is performed only once, such an arrangement requires one-time fuel injection which allows a sufficient area of the reducing region in the catalysis to be prepared in an extremely short period of time immediately after the end of F/C. This requires the first rich air/fuel ratio setting to a considerably rich air/fuel ratio. In other words, such one-time fuel injection requires a considerable amount of fuel to be injected. Accordingly, such one-time fuel injection increases a risk of accidental fire.

Accordingly, in order to prevent such accidental fire with the highest priority, with the aforementioned arrangement, fuel injection corresponding to the first rich air/fuel ratio is performed multiple times over a sufficiently short period of time (the aforementioned short period of time) which does not lead to the driver experiencing lag sensation. With such an arrangement, each fuel injection is performed using a small amount of the fuel, thereby preventing accidental fire.

BEST MODE FOR CARRYING OUT THE INVENTION

Description will be made regarding a fuel-injection control device for an internal combustion engine according to embodiments of the present invention with reference to the drawings.

First Embodiment

Figure 1:
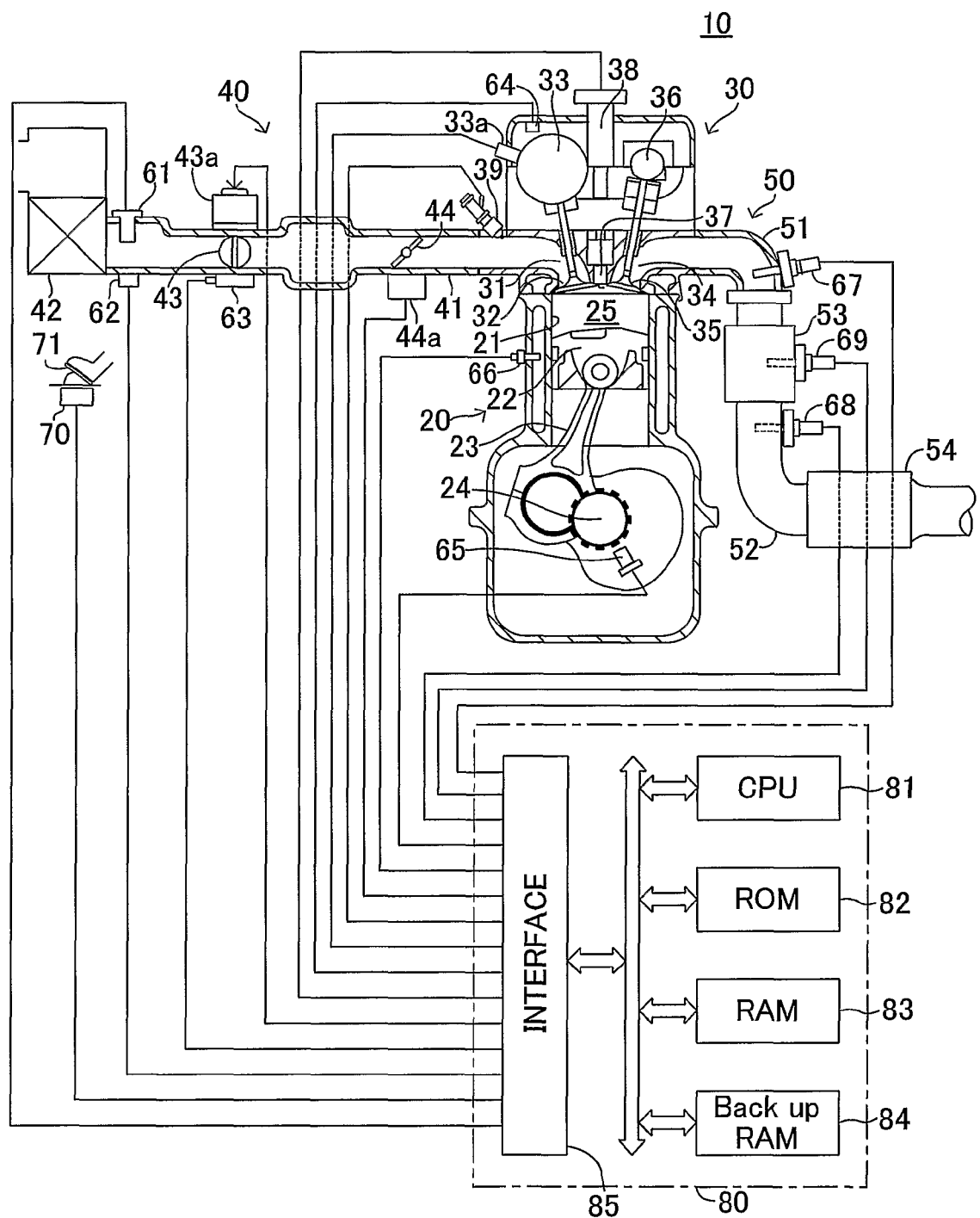
FIG. 1 is a schematic diagram which shows a fuel injection control device applied to an internal-combustion engine according to a first embodiment of the present invention.

FIG. 1 shows a schematic configuration of a system in which a fuel-injection control device according to a first embodiment of the present invention is applied to a four-cycle spark ignition multi-cylinder internal combustion engine 10. While FIG. 1 shows a cross-section of only one cylinder, the other cylinders have the same configuration.

The internal combustion engine 10 comprises: a cylinder block unit 20 including a cylinder block, cylinder block lower casing, an oil pan, and so forth; a cylinder head unit 30 fixed above the cylinder block unit 20; an inlet system 40 for supplying a gasoline mixture to the cylinder block unit 20; and an exhaust system 50 for discharging exhaust from the cylinder block unit 20 to the exterior.

The cylinder block 20 comprises: a cylinder 21; a piston 22; a connecting rod 23; and a crank shaft 24. With such a configuration, the piston 22 performs reciprocating motion within the cylinder 21. The reciprocating motion of the piston 22 is transmitted to the crank shaft 24 through the connecting rod 23, thereby rotating the crank shaft 24. The cylinder 21 and the head of the piston 22 form a combustion chamber 25 along with the cylinder head unit 30.

The cylinder head unit 30 comprises: an inlet port 31 communicating with the combustion chamber 25; an inlet valve 32 for opening/closing the inlet port 31; a variable inlet timing arrangement 33 which includes an intake cam shaft for driving the inlet valve 32 and which has a function of continuously adjusting the phase angle and the lift amount of the intake cam shaft; an actuator 33a for the variable inlet timing arrangement 33; an exhaust port 34 communicating with the combustion chamber 25; an exhaust valve 35 for opening/closing the exhaust port 34; an exhaust cam shaft 36 for driving the exhaust valve 35; a spark plug 37; an igniter 38 including an ignition coil for generating high voltage supplied to the spark plug 37; and an injector (fuel-injecting means) 39 for injecting fuel into the inlet port 31.

The inlet system 40 comprises an inlet pipe 41 including an intake manifold which communicates with the inlet port 31 and which forms an inlet path along with the inlet port 31; an air filter 42 provided to the end of the inlet pipe 41; a throttle valve 43 and a swirl control valve 44 which are included within the inlet pipe 41 and which allow adjustment of the opening cross-section of the inlet path.

The throttle valve 43 has a configuration which allows rotational driving thereof within the inlet pipe 41 via the driving action of a throttle valve actuator 43a made up of a DC motor. On the other hand, the SCV 44 has a configuration which allows rotational driving thereof via the driving action of a SCV actuator 44a made up of a DC motor.

The exhaust system 50 comprises: an exhaust manifold 51 communicating with the exhaust port 34; an exhaust pipe 52 connected to the exhaust manifold 51; an upstream catalysis 53 provided to the exhaust pipe 52; and a downstream catalysis 54 provided at a position downstream of the upstream catalysis 53 in the exhaust pipe 52. The exhaust port 34, the exhaust manifold 51, and the exhaust pipe 52 form an exhaust path.

Each of the upstream catalysis 53 and the downstream catalysis 54 is a three way catalyst arrangement holding an active component formed of so-called noble metals such as platinum and so forth. With regard to a gas flowing through the catalysis at approximately the theoretical air/fuel ratio, each catalysis has the aforementioned oxidation function of oxidizing unburned components such as HC, CO, and so forth, as well as a function of reducing $NO_x$. Furthermore, each catalysis has an oxygen adsorption function of adsorbing (storing) oxygen. This oxygen adsorption function enables detoxification of unburned HC and CO, and NOx, even if the air/fuel ratio deviates from the theoretical air/fuel ratio. The oxygen adsorption function is due to ceria ($CeO2$) held by the catalysis.

On the other hand, the system includes: a hot wire air flow meter 61; an intake gas temperature sensor 62; a throttle position sensor 63; a cam position sensor 64; a crank position sensor 65; a water temperature sensor 66; an air/fuel ratio sensor 67; an oxygen concentration sensor 68; a catalysis temperature sensor 69; and an accelerator opening sensor 70.

The air flow meter 61 has a mechanism for outputting a signal corresponding to the mass flow Ga of the intake air flowing through the inlet pipe 41. The intake gas temperature sensor 62 detects the temperature of the intake air, and outputs a signal representing the intake gas temperature THA. The throttle position sensor 63 detects the opening (throttle valve opening) of the throttle valve 43, and outputs a signal representing the throttle valve opening TA.

The cam position sensor 64 generates one pulse signal (G2 signal) every time that the intake cam shaft rotates by 90° (i.e., every time that the crank shaft 24 rotates by 180°). The crank position sensor 65 outputs a signal with a narrow pulse every time that the crank shaft 24 rotates by 10°. Furthermore, the crank position sensor 65 outputs a signal with a wide pulse every time that the crank shaft 24 rotates by 360°. This signal represents the engine speed NE. The water temperature sensor 66 detects the temperature of the cooling water for the internal combustion engine 10, and outputs a signal representing the cooling water temperature THW.

Figure 2:
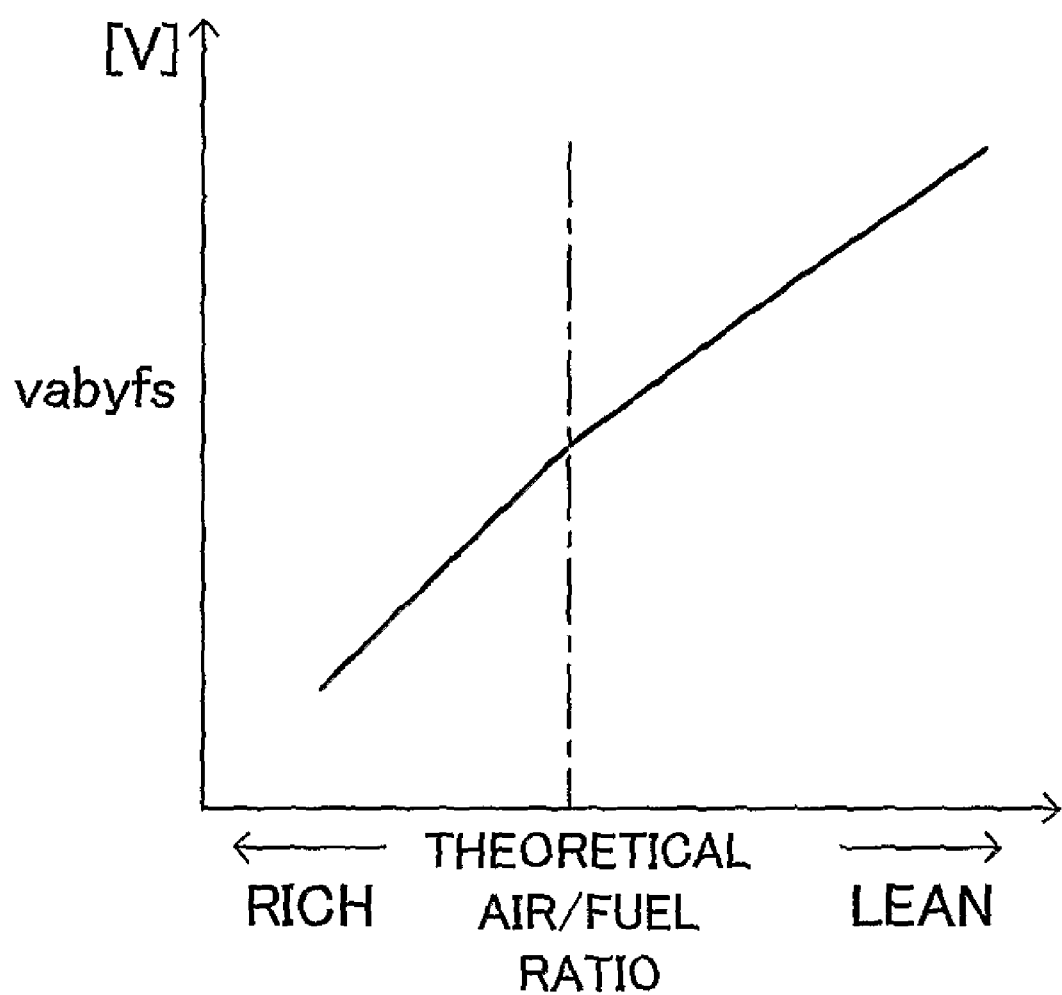
FIG. 2 is a chart which shows the relation between the output of an air/fuel ratio sensor shown in FIG. 1 and the air/fuel ratio.

The air/fuel ratio sensor 67 is provided at a position upstream of the upstream catalysis 53 in the exhaust path. The air/fuel ratio sensor 67 is a so-called limiting-current type oxygen concentration sensor. The air/fuel ratio sensor 67 has a mechanism for detecting the air/fuel ratio of the exhaust flowing into the upstream catalysis 53, as well as outputting a signal vabyfs corresponding to the air/fuel ratio thus detected, as shown in FIG. 2.

Figure 3:
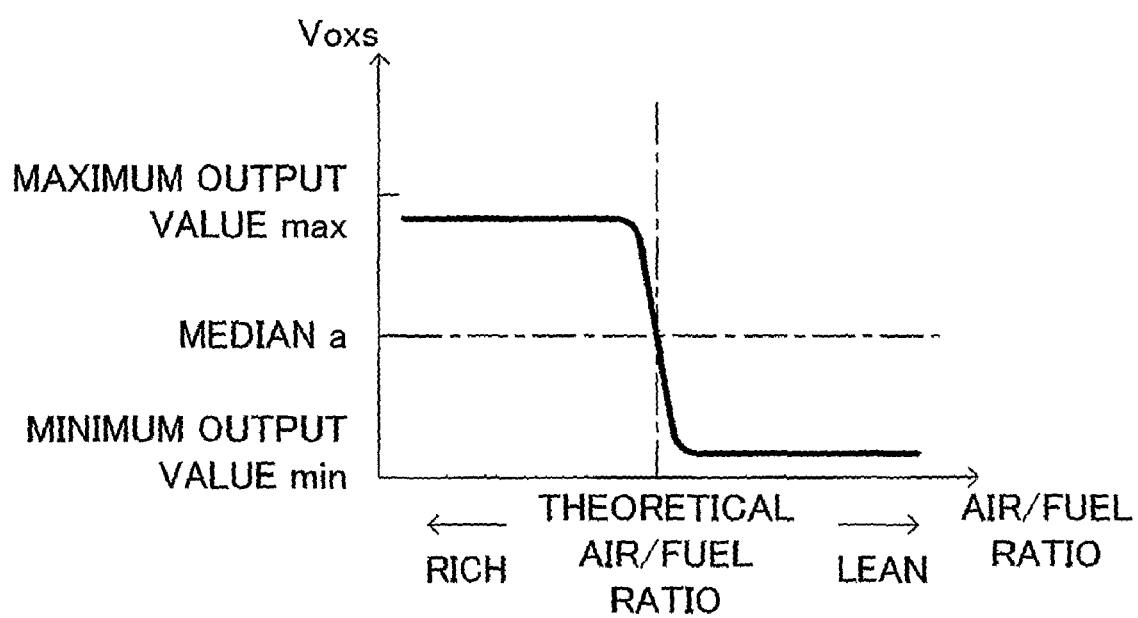
FIG. 3 is a chart which shows the relation between the output of an oxygen concentration sensor shown in FIG. 1 and the air/fuel ratio.

The oxygen concentration sensor 68 is provided at a position downstream of the upstream catalysis 53 and upstream of the downstream catalysis 54 in the exhaust path. The oxygen concentration sensor 68 is a so-called concentration-cell-type oxygen concentration sensor. FIG. 3 shows the (static) properties of the output Voxs from the oxygen concentration sensor 68. That is to say, the oxygen concentration sensor 68 outputs the maximum output value max, and the minimum output value min, corresponding to a rich air/fuel ratio and a lean air/fuel ratio of the gas which is to be measured, as compared with the theoretical air/fuel ratio, respectively. Furthermore, the oxygen concentration sensor 68 outputs an approximately middle value (median) a between the maximum output value max and the minimum output value min when the air/fuel ratio of the gas which is to be measured is the theoretical air/fuel ratio.

The accelerator opening sensor 70 has a mechanism for outputting a signal representing the operation amount Accp of the accelerator pedal 71 operated by the driver.

An electric control device 80 is a microcomputer which comprises: a CPU 81; ROM 82 for storing a program, table (map, function), constants, and so forth, used by the CPU 81; RAM 83 for temporarily storing data as necessary; backup RAM 84 for storing the data in the power-on state as well as for holding the data thus stored regardless of whether power is ON or OFF; an interface 85 including an AD converter; and so forth. Note that these components are connected with each other via a bus.

The interface 85 is connected to the aforementioned sensors 61 through 70 so as to supply signals to the CPU 81 from the sensors 61 through 70. Furthermore, the interface 85 transmits driving signals to the actuator 33a, igniter 38, injector 39, throttle valve actuator 43a, and the SCV actuator 44a of the variable inlet timing arrangement 33 according to instructions from the CPU 81.

(Outline of the Air/Fuel Ratio Feedback Control)

Next, description will be made regarding an outline of the air/fuel ratio feedback control performed by the fuel-injection control device (which will also be referred to as "present device" hereafter) having the aforementioned configuration. The present device controls the air/fuel ratio of a mixture supplied to the engine (i.e., the air/fuel ratio of the engine) such that the air/fuel ratio of a gas flowing from the upstream catalysis 53 (i.e., the air/fuel ratio of a gas flowing into the downstream catalysis 54) matches the theoretical air/fuel ratio AFstoich.

Specifically, feedback control is performed for the air/fuel ratio of the engine based upon the output Voxs (in practice, feedback control is also as based upon the output vabyfs from the air/fuel ratio sensor 67), i.e., such that the output Voxs from the oxygen concentration sensor 68 provided at a position downstream of the upstream catalysis 53 matches the target value Voxsref (in this case, the aforementioned median a) corresponding to the theoretical air/fuel ratio AFstoich. As a result, the oxygen adsorption amount of the upstream catalysis 53 (and the downstream catalysis 54) is kept at a suitable value (e.g., around half of the maximum oxygen adsorption amount).

Furthermore, upon satisfying a predetermined condition, the present device stops the aforementioned air/fuel ratio feedback control as well as performing the fuel cut operation (F/C). Upon completion of the F/C, the present device executes the rich air/fuel ratio control after F/C (described later), thereby adjusting the oxygen adsorption amount of the upstream catalysis 53 to a predetermined suitable value. Then, the present device performs the aforementioned air/fuel ratio feedback control again, after the end of the rich air/fuel ratio control after F/C. The above is the outline of the air/fuel ratio feedback control.

(Outline of Rich Air/Fuel Ratio Control after F/C)

Figure 4:
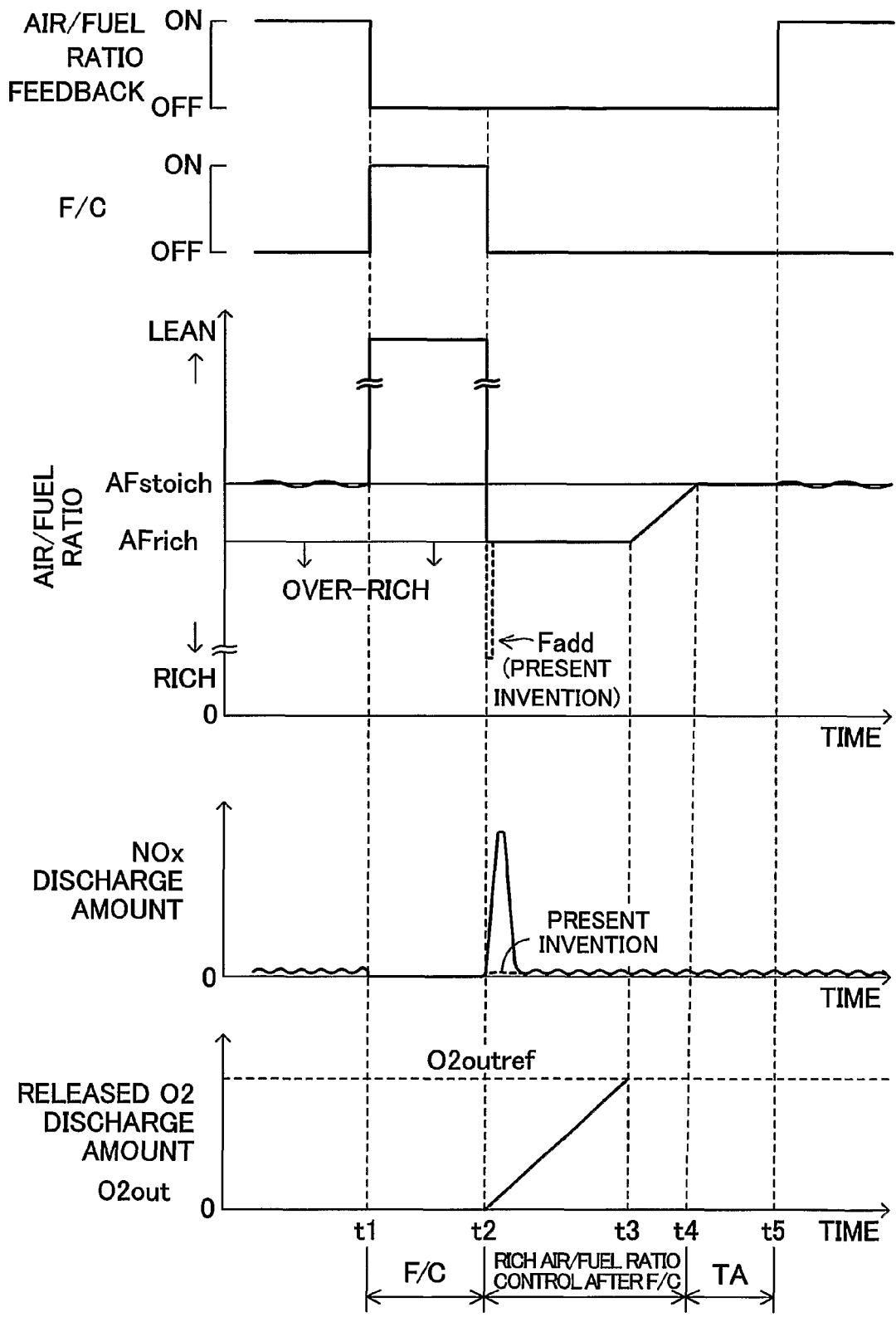
FIG. 4 is a timechart which shows an example of changes in the air/fuel ratio of the engine and the amount of $No_x$ ($No_x$ discharge amount) flowing from the upstream catalysis during execution of F/C and the rich air/fuel ratio control after F/C performed by the fuel injection control device shown in FIG. 1.

Description will be made below regarding the outline of rich air/fuel ratio control after F/C performed by the present device with reference to the timing chart shown in FIG. 4. The timing chart shown in FIG. 4 shows an example of change in the air/fuel ratio of the engine and change in the amount of NOx (NOx discharge amount) flowing from the upstream catalysis 53 over the course of an operation in which the aforementioned air/fuel ratio feedback control is executed before the point in time t1, and F/C is executed during the period of time from the point in time t1 up to t2.

In this case, the air/fuel ratio of the engine is controlled to around the theoretical air/fuel ratio AFstoich before the point in time t1. As a result, the oxygen adsorption amount of the upstream catalysis 53 is kept at the aforementioned suitable value before the point in time t1, as well as allowing the upstream catalysis 53 to exhibit the suitable oxidation/reduction functions and suitable oxygen adsorption function. This suppresses the NOx discharge amount to an extremely small amount.

After the point in time t1, F/C is started, and the air/fuel ratio feedback control is stopped. Note that F/C is continued until the point in time t2. This maintains an extremely lean air/fuel ratio of the engine during the period of time from the point in time t1 up to t2. This gradually increases the oxygen adsorption amount of the upstream catalysis 53 (and the downstream catalysis 54). Eventually, the oxygen adsorption amount reaches the maximum oxygen adsorption amount at the point in time t2. Note that the $NO_x$ discharge amount is suppressed to zero due to stop of combustion in the combustion chamber 25 during the period of time from the point in time t1 up to t2.

After the point in time t2, F/C ends. Furthermore, immediately after the point in time t2, the rich air/fuel ratio control after F/C is started. Let us say that, in the rich air/fuel ratio control after F/C, the air/fuel ratio of the engine is kept at a constant value of the aforementioned over-rich air/fuel ratio (That is, the air/fuel ratio corresponding to the aforementioned first rich air/fuel ratio. Operation at this air/fuel ratio for a relatively long time leads to the driver experiencing lag sensation. Around 11, for example). This leads to the driver experiencing lag sensation.

In order to prevent the driver experiencing lag sensation, let us consider an arrangement in which the air/fuel ratio of the engine is kept at a constant rich air/fuel ratio AFrich (That is, the air/fuel ratio corresponding to the aforementioned second rich air/fuel ratio. The operation at this air/fuel ratio for a relatively long time does not lead to the driver experiencing lag sensation. Around 13, for example.) which is leaner than the over-rich air/fuel ratio, immediately after the point in time t2, as indicated by the solid line in FIG. 4.

This causes a phenomenon in which the NOx discharge amount is temporarily increases over an extremely short period of time immediately after the point in time t2 (i.e., at the end point of F/C) (in a pulsed manner), as indicated by the solid line in FIG. 4. At this point in time, the oxygen adsorption amount of the downstream catalysis 54 reaches the maximum oxygen adsorption amount. This leads to discharge of a relatively large amount of NOx from the upstream catalysis 53 to the exterior without detoxification although the NOx flows into the downstream catalysis 54.

Figure 5:
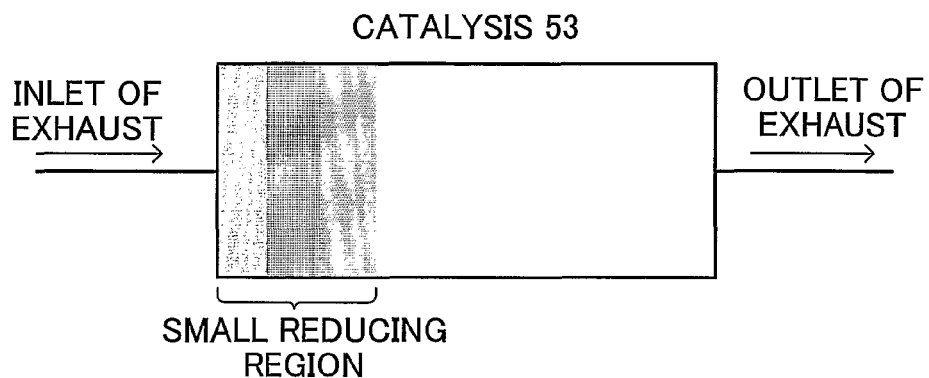
FIG. 5A is a diagram which shows the state of the oxygen release reaction occurring in the upstream catalysis during an extremely short period of time immediately after the end of F/C in a case of maintaining the air/fuel ratio of the engine at a shallow rich air/fuel ratio immediately after the end of F/C.
FIG. 5B is a diagram which shows the state of the oxygen release reaction occurring in the upstream catalysis during an extremely short period of time immediately after the end of F/C in a case of performing one-time fuel injection corresponding to an over-rich air/fuel ratio immediately after the end of F/C.
Figure 5:
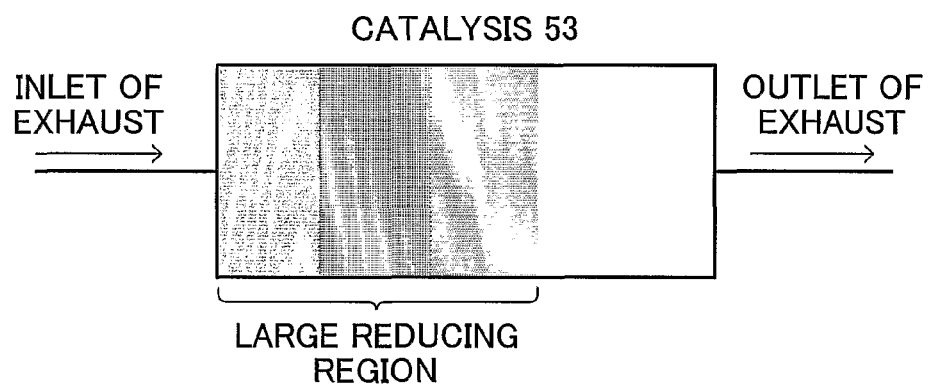

It is thought that such a phenomenon, in which the NOx discharge amount from the upstream catalysis 53 temporarily increases over an extremely short period of time, occurs due to the fact that a sufficient amount of the aforementioned region (the aforementioned reducing region) having the aforementioned reducing function is not obtained in the upstream catalysis 53 during the extremely short period of time immediately after the end of F/C. Description will be made below regarding this phenomenon with reference to FIG. 5.

FIG. 5A shows the state (distribution) of the oxygen release reaction (reaction in which the adsorbed oxygen is released) occurring in the upstream catalysis 53 involved in the oxidation reaction of unburned HC and CO flowing into the upstream catalysis 53 during an extremely short period of time immediately after F/C in this case (i.e., in a case that the air/fuel ratio of the engine is kept at a shallow rich air/fuel ratio AFrich immediately after the end of F/C). The density of color indicated by dots represents the frequency of the oxygen release reaction. The denser the color, the higher the frequency of the oxygen release reaction.

As shown in FIG. 5A, the closer the upstream catalysis 53 is to the upstream side, the higher the frequency of the oxygen release reaction, due to the fact that this reaction occurs in the order of flow. On the other hand, the oxygen amount which the upstream catalysis 53 can releases per unit time and per unit volume (oxygen adsorption capacity, oxygen release speed) has a limit. Accordingly, the greater the amount of unburned HC and CO flowing into the upstream catalysis 53 per unit time, the closer to the downstream side is the infiltration of the unburned HC and CO which have not been oxidized. As a result, the oxygen release reaction occurs over the region up to a portion further downstream in the upstream catalysis 53.

That is to say, the richer the air/fuel ratio (accordingly, air/fuel ratio of the engine) of the gas flowing into the upstream catalysis 53 is than the theoretical air/fuel ratio ADstoich, the closer to the downstream side of the upstream catalysis 53 is, the infiltration of the region where the oxygen release reaction occurs. With the present arrangement, the air/fuel ratio of the engine is kept at a shallow rich air/fuel ratio AFrich immediately after the end of F/C. With such an arrangement, only a small region on the upstream side of the upstream catalysis 53 allows the oxygen release reaction in an extremely short period of time immediately after the end of F/C as shown in FIG. 1.

In this case, the aforementioned region which allows the oxygen release reaction corresponds to the aforementioned reducing region having a reduction function. This means that such an arrangement leads to an insufficient reducing region in the upstream catalysis 53 during an extremely short period of time immediately after the end of F/C.

On the other hand, let us consider a case in which the exhaust flows into the upstream catalysis 53 at a richer air/fuel ratio than the theoretical air/fuel ratio AFstoich. In this case, the greater the reducing region formed in the upstream catalysis 53, the higher the efficiency of detoxification by actions of the aforementioned reduction function.

Based upon the aforementioned facts, it is thought that in a case of maintaining a constant and shallow rich air/fuel ratio AFrich of the engine immediately after the end of F/C, the NOx discharge amount from the upstream catalysis 53 temporarily increases during an extremely short period of time. In this case, following the aforementioned short period of time immediately after the end of F/C, the region which allows the oxygen release reaction (i.e., reducing region) extends (i.e., increases) up to the downstream portion in the upstream catalysis 53 over time. This suppresses the $NO_x$ discharge amount to an extremely small amount.

As can be understood from the above description, in order to prevent such a temporary increase in the $NO_x$ discharge amount immediately after the end of F/C, there is a need to prepare a sufficient area of the reducing region within the upstream catalysis 53 over the extremely short period of time immediately after the end of F/C. This requires a sufficiently rich air/fuel ratio (over-rich air/fuel ratio) over the period of time immediately after the end of F/C. However, maintaining of an over-rich air/fuel ratio for a relatively long time leads to the driver experiencing lag sensation. Accordingly, there is a need to maintain such an over-rich air/fuel ratio of the engine only during a short period of time.

With the present device, fuel injection is performed only once immediately after the end of F/C (immediately after the point in time t2) for the over-rich air/fuel ratio as indicated by broken lines in FIG. 4. Specifically, the present device injects an amount of fuel which is the sum of the fuel amount corresponding to the shallow rich air/fuel ratio AFrich and a predetermined addition (asynchronous addition Fadd described later), thereby performing fuel injection for the over-rich air/fuel ratio only once.

Subsequently, the present device performs fuel injection for the shallow rich air/fuel ratio AFrich immediately after the aforementioned first fuel injection. Thus, the air/fuel ratio of the engine is temporarily set to the over-rich air/fuel ratio (first rich air/fuel ratio) during an extremely short period immediately after the point in time t2. Immediately after this operation, the air/fuel ratio of the engine is switched to the shallow rich air/fuel ratio AFrich (second rich air/fuel ratio) (i.e., the fuel ratio is controlled in a two-stage manner).

FIG. 5B shows the distribution of the oxygen release reaction (accordingly, the reducing region) occurring in the upstream catalysis 53 during an extremely short period of time immediately after F/C in the same format as shown in FIG. 5A in this case (i.e., in a case that fuel injection is performed once for the over-rich air/fuel ratio immediately after the end of F/C).

As shown in FIG. 5B, in this case, the reducing region extends up to the downstream portion in the upstream catalysis 53 in an extremely short period of time immediately after the end of F/C, thereby preparing a sufficient area of the reducing region. This prevents a temporary increase in the aforementioned $NO_x$ discharge amount during an extremely short period immediately after the end of F/C as indicated by broken lines in FIG. 4. Furthermore, this suppresses the period of time, during which the engine is operated at the over-rich air/fuel ratio, to an extremely short period of time, thereby preventing the driver experiencing lag sensation.

Figure 6:
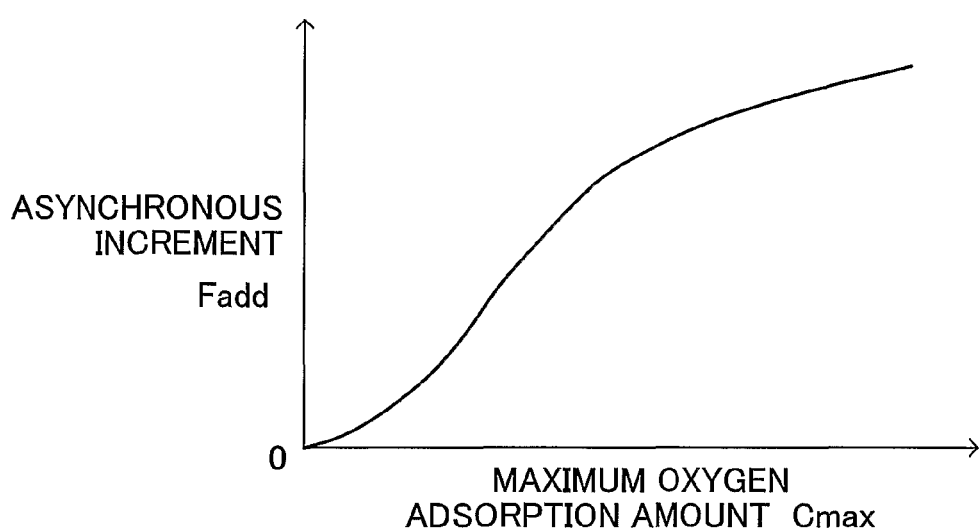
FIG. 6 is a chart which shows a table indicating the relation between the maximum oxygen adsorption amount of the upstream catalysis and an asynchronous increment, which is referred by a CPU shown in FIG. 1.

Here, the aforementioned asynchronous addition Fadd is determined based upon a table MpaFad indicating the relation between the maximum oxygen adsorption amount Cmax (oxygen adsorption capacity index value, deterioration index value) and the asynchronous addition Fadd shown in FIG. 6, and the maximum oxygen adsorption amount Cmax. The maximum oxygen adsorption amount Cmax can be obtained using known techniques (e.g., using a technique described later). Thus, the greater the maximum oxygen adsorption amount Cmax, the greater the asynchronous addition Fadd which is to be set. This is due to the following reason.

That is to say, the smaller the deterioration in the upstream catalysis 53 (the fresher the upstream catalysis 53), the greater the oxygen amount (corresponding to the oxygen adsorption capacity, oxygen release speed) which the upstream catalysis 53 can release per unit time and per unit volume. Now, let us say that the gas flows into the upstream catalysis 53 at a richer air/fuel ratio (accordingly, the air/fuel ratio of the engine) than the theoretical air/fuel ratio AFstoich. In this case, the smaller the deterioration in the upstream catalysis 53, the shallower the region where the oxygen release reaction can occur on the upstream side of the upstream catalysis 53. In other words, the smaller the deterioration in the upstream catalysis 53, the smaller the reducing region in the upstream catalysis 53 during an extremely short period of time immediately after the end of F/C.

Accordingly, in order to prepare a sufficient area of the reducing region in the upstream catalysis 53 during the extremely short period of time immediately after the end of F/C in a sure manner regardless of the deterioration in the upstream catalysis 53 (i.e., in order to prevent the aforementioned temporary increase in the NOx discharge amount during a short period of time in a sure manner), there is a need to set the aforementioned over-rich air/fuel ratio such that the smaller the deterioration in the upstream catalysis 53, the richer the over-rich air/fuel ratio, i.e., the greater the fuel-injection amount (accordingly, the aforementioned asynchronous addition Fadd) corresponding to the over-rich air/fuel ratio.

On the other hand, the smaller the deterioration in the upstream catalysis 53, the greater the maximum oxygen adsorption amount Cmax of the upstream catalysis 53. Accordingly, the greater the maximum oxygen adsorption amount Cmax of the upstream catalysis 53, the asynchronous addition Fadd which is to be set.

After the point in time t2, the exhaust flows into the upstream catalysis 53 at a richer air/fuel ratio than the theoretical air/fuel ratio AFstoich. This gradually reduces the oxygen adsorption amount of the upstream catalysis 53 from the maximum oxygen adsorption amount. With such an arrangement, it is thought that the operation of the engine at the aforementioned shallow rich air/fuel ratio AFrich is preferably continued until, and preferably ends at the point in time as follows. That is to say, at this point in time, the oxygen adsorption amount of the upstream catalysis 53 is reduced from the maximum oxygen adsorption amount to a certain oxygen adsorption amount which allows effective detoxification of $NO_x$ contained in the exhaust flowing into the upstream catalysis 53 with a leaner air/fuel ratio than the theoretical air/fuel ratio AFstoich after the rich air/fuel ratio control after F/C (i.e., after returning to the aforementioned air/fuel ratio feedback control). The decrease in the oxygen adsorption amount of the upstream catalysis 53 from the maximum oxygen adsorption amount will be referred to as "request reducing amount O2outref" hereafter.

With such an arrangement, the present device counts (updates) the integrated value (which will be referred to as "released O2 amount O2out" hereafter) of the oxygen amount released from the upstream catalysis 53 after the point in time of the start of fuel injection corresponding to the shallow rich air/fuel ratio AFrich.

Specifically, after the point in time of the start of fuel injection corresponding to the shallow rich air/fuel ratio AFrich, the present device calculates the decrement $\Delta O2$ of the adsorbed oxygen amount corresponding to each fuel injection based upon the following expressions (1) and (2), and integrates the decrements $\Delta O2$ thus calculated, thereby updating the released O2 amount O2out.

$$\Delta O2 = 0.23 \cdot Fi \cdot (AFstoich - AFrich) \tag{1}$$

$$O2out = \Sigma \Delta O2 \tag{2}$$

In the above expression (1), the value "0.23" represents the weight ratio of oxygen contained in the atmosphere. On the other hand, Fi represents the fuel-injection amount for each fuel injection. Note that AFrich can be replaced with the air/fuel ratio detected by the air/fuel ratio sensor 67.

As indicated by expression (1), the fuel injection amount Fi for each fuel injection is multiplied by the deviation of the aforementioned shallow rich air/fuel ratio AFrich from the theoretical air/fuel ratio AFstoich, i.e., (AFstoich−AFrich), thereby obtaining the shortage of air for each fuel injection. Then, the shortage of air is multiplied by the weight ratio of oxygen, thereby obtaining the adsorbed-oxygen decrement (adsorbed-oxygen discharge amount) ΔO2 of the upstream catalysis 53 corresponding to each fuel injection.

Then, as indicated by expression (2), the adsorbed-oxygen decrement ΔO2 is integrated from the point in time of the start of fuel injection corresponding to the shallow rich air/fuel ratio AFrich, thereby updating the released O2 amount O2out after the aforementioned point in time of the start of fuel injection. As described above, with the present arrangement, the released O2 amount O2out is estimated based upon the fact that the air/fuel ratio of the engine is controlled at the shallow rich air/fuel ratio AFrich (second rich air/fuel ratio). Accordingly, the released O2 amount O2out increases from zero after the point in time t2 (specifically, after the point in time that fuel injection has been started corresponding to the shallow rich air/fuel ratio FArich) as shown in FIG. 4.

Then, with the present device, upon the released O2 amount O2out reaching the aforementioned request reducing amount O2outref (at the point in time t3), the fuel injection corresponding to the shallow rich air/fuel ratio AFrich ends. Subsequently, the air/fuel ratio of the engine is adjusted so as to gradually approach the theoretical air/fuel ratio AFstoich from the shallow rich air/fuel ratio AFrich. Such a step will be referred to as "air/fuel ratio transition step" hereafter.

Figure 7:
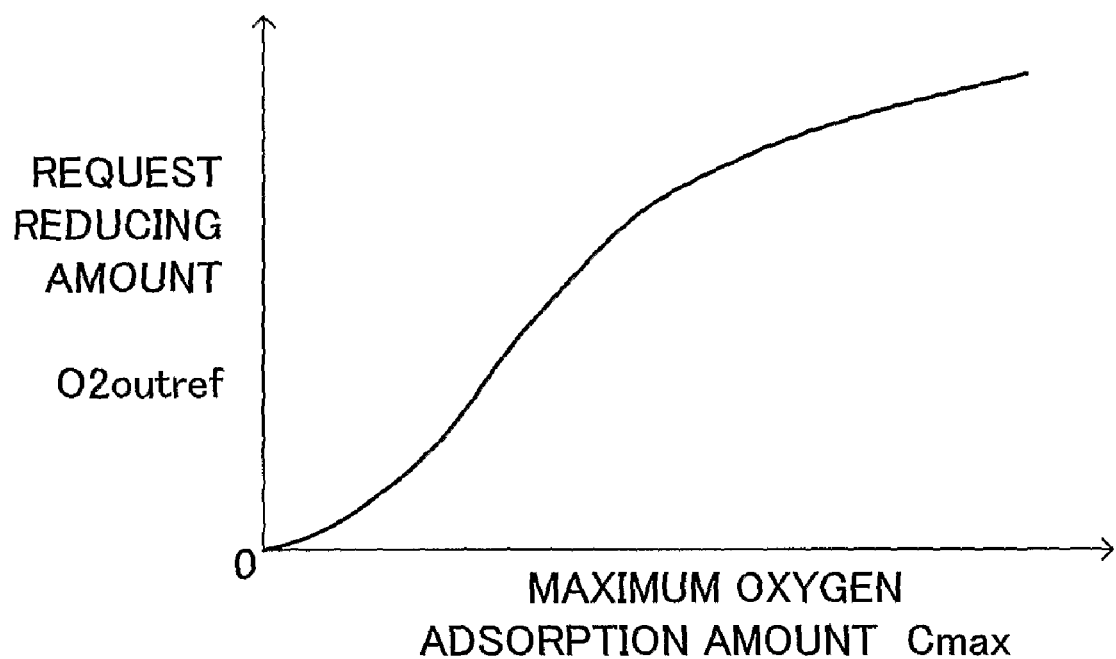
FIG. 7 is a chart which shows a table indicating the relation between the maximum oxygen adsorption amount of the upstream catalysis and a request reducing amount, which is referred by the CPU shown in FIG. 1.

Here, the aforementioned request reducing amount O2outref is determined based upon a table MapO2outref (Cmax) indicating the relation between the maximum oxygen adsorption amount Cmax of the upstream catalysis 53 and the request reducing amount O2outref shown in FIG. 7, and the maximum oxygen adsorption amount Cmax. Accordingly, the smaller the maximum oxygen adsorption amount Cmax, the smaller the request reducing amount O2outref which is to be set. This is due to the following reason.

That is to say, at the point in time that the released O2 amount O2out has reached the aforementioned request reducing amount O2outref (at the point in time t3), the oxygen adsorption amount of the upstream catalysis 53 is represented by expression Cmax−O2outref. Now, let us say that the request reducing amount O2outref is constant regardless of the maximum oxygen adsorption amount Cmax. In this case, the smaller the maximum oxygen adsorption amount Cmax, the smaller the oxygen adsorption amount of the upstream catalysis 53 at the point in time t3.

This leads to the following problem. That is to say, the smaller the maximum oxygen adsorption amount Cmax, the greater the amount of unburned HC and CO flowing from the upstream catalysis 53 due to unsatisfactory detoxification thereof in a case that the exhaust flows into the upstream catalysis 53 at a richer air/fuel ratio than the theoretical air/fuel ratio AFstoich after the rich air/fuel ratio control after F/C (i.e., after the restart of the aforementioned air/fuel ratio feedback control).

Accordingly, the smaller the maximum oxygen adsorption amount Cmax, the smaller the request reducing amount O2outref which is to be set, giving consideration to the tradeoff between the detoxification capacity of the upstream catalysis 53 for NOx and that for unburned HC and CO following the end of rich air-fuel ratio control after F/C (i.e., after the restart of the aforementioned air/fuel ratio feedback control).

Upon the air/fuel ratio of the engine matching the theoretical air/fuel ratio AFstoich at the point in time t4, with the present device, the aforementioned air/fuel ratio transition step ends, and accordingly, rich air/fuel ratio control after F/C ends. At the same time, after the aforementioned point in time t4, the air/fuel ratio of the engine is kept at the constant theoretical air/fuel ratio AFstoich over a predetermined period of time TA. Note that the air/fuel ratio feedback control is also stopped over the predetermined period of time TA.

The reason why the aforementioned operation is performed is as follows. That is to say, with the present arrangement, after the point in time that the air/fuel ratio has become the constant theoretical air/fuel ratio AFstoich, the exhaust flows into the upstream catalysis 53 at the constant theoretical air/fuel ratio over a predetermined period of time, thereby allowing the oxygen concentration sensor 68 to operate in a sure manner after the point in time of the restart of air/fuel ratio feedback control. This enables suitable air/fuel feedback control after the point in time of the restart of air/fuel ratio feedback control.

Then, after the elapse of the aforementioned predetermined period of time TA, i.e., at the point in time t5, the present device restarts the air/fuel ratio feedback control. The above is the outline of the rich air/fuel ratio control after F/C performed by the present device.

(Actual Operation)

Figure 8:
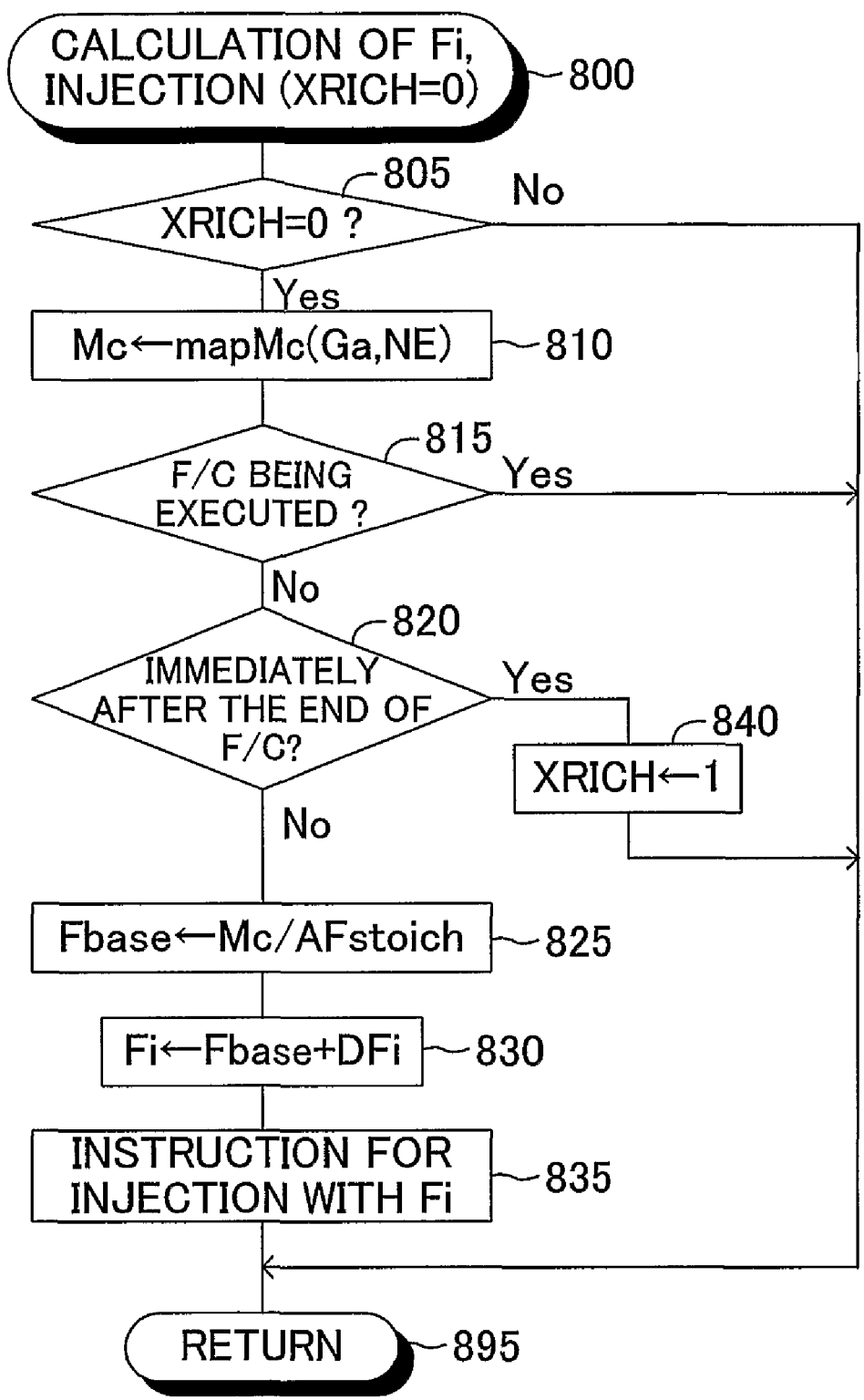
FIG. 8 is a flowchart which shows a routine executed by the CPU shown in FIG. 1, for performing fuel injection control during the period of time that the rich air/fuel ratio control after F/C is not performed.

Next, description will be made regarding a routine (program) executed by the CPU 81 included in the electric control device 80 for performing the actual operation of the fuel injection control device having the aforementioned configuration with reference to the flowcharts shown in FIGS. 8 through 12. Note that the flowchart shown in FIG. 8 shows the operation of fuel-cut processing executing means for performing F/C corresponding to the operation state of the engine. The flowchart shown in FIG. 11 shows the operation of post-fuel-cut-processing rich air/fuel ratio control means for performing rich air/fuel ratio control after F/C by controlling the rich air/fuel ratio of the engine in a two-stage manner.

The CPU 81 executes a routine shown in FIG. 8 for calculating the fuel-injection amount Fi and requesting fuel injection for the operation without involving the rich air/fuel ratio after F/C every time that the crank angle of a predetermined cylinder becomes a predetermined crank angle (e.g., BTDC90°CA) before the top dead center of the cylinder. Thus, upon the crank angle of the predetermined cylinder becoming the aforementioned predetermined crank angle, the CPU 81 starts the processing from Step 800, and the flow proceeds to Step 805 where determination is made whether or not a rich air/fuel ratio control execution flag XRICH matches "0". Here, the rich air/fuel ratio control execution flag XRICH of "1" represents that the rich air/fuel ratio control after F/C is being carried out. On the other hand, rich air/fuel ratio control execution flag XRICH of "0" represents that the rich air/fuel ratio control after F/C is not being carried out.

Now, let us say that the rich air/fuel ratio control after F/C is not being carried out, and F/C is not being carried out (see the operation before the point in time t1 in FIG. 4). In this case, in Step 805, the CPU 81 makes a determination of "Yes", whereby the flow proceeds to Step 810 where the CPU 81 obtains a cylinder intake-air amount Mc based upon an intake-air amount Ga measured by the air flow meter 61 and the engine revolution speed NE using a table MapMc(Ga, NE).

Next, the flow proceeds to Step 815 where the CPU 81 determines whether or not F/C is being carried out at the current point in time. In this case, F/C is not executed at the current point in time. Accordingly, in Step 815, the CPU 81 makes a determination of "No", whereby the flow proceeds to Step 820. In Step 820, the CPU 81 determines whether or not the current point in time is immediately after F/C. In this case, the CPU 81 also makes a determination of "No", whereby the flow proceeds to Step 825.

In Step 825, the CPU 81 obtains a basic fuel injection amount Fbase, which is a fuel amount for setting the air/fuel ratio of the engine to the theoretical air/fuel ratio AFstoich, by dividing the cylinder intake-air amount Mc by the theoretical air/fuel ratio AFstoich. Next, the flow proceeds to Step 830 where the CPU 81 sets the fuel-injection amount Fi to the sum of the basic fuel injection amount Fbase thus obtained and an air/fuel ratio feedback correction amount DFi described later.

Then, the flow proceeds to Step 835 where the CPU 81 instructs the injector 39 corresponding to the aforementioned predetermined cylinder to inject fuel of the fuel injection amount Fi. Then, the flow proceeds to Step 895, whereby the present routine temporarily ends. Thus, fuel of the fuel injection amount Fi subjected to air/fuel ratio feedback correction is injected into the cylinder before the air-intake step.

Next, description will be made regarding calculation of the aforementioned air/fuel ratio feedback correction amount DFi. The CPU 81 repeatedly executes a routine shown in FIG. 9 at regular intervals. Thus, the CPU 81 starts the processing from Step 900 at the regular intervals, and the flow proceeds to Step 905 where the CPU 81 determines whether or not the air/fuel ratio feedback control conditions are satisfied. Note that the air/fuel ratio feedback control conditions are satisfied in a case that: F/C has not been executed; the rich air/fuel ratio control after F/C has not been executed (XRICH=0); the aforementioned period of time TA has elapsed after the end of the latest rich air/fuel ratio control after F/C; the cooling water temperature THW of the engine, detected by the water temperature sensor 66, is a predetermined first temperature or more; the intake air amount (load) for each cycle of the engine is a predetermined value or less; and the air/fuel ratio sensor 67 is in the normal state, for example.

Now, let us say that the air/fuel ratio feedback control conditions are satisfied. In this case, the flow proceeds to Step 905 where the CPU 81 makes a determination of "Yes", whereby the flow proceeds to Step 910 where the CPU 81 obtains the air/fuel ratio on the upstream side of the upstream catalysis 53 at the current point in time based upon the sum (vabyfs+vafsfb) of the output vabyfs of the air/fuel ratio sensor 67 at the current point in time and a sub-feedback control amount vafsfb described later, and the map shown in FIG. 2. The air/fuel ratio thus obtained is a so-called apparent air/fuel ratio of the gas upstream of the upstream catalysis 53, which will be referred to as "upstream control air/fuel ratio abyfs" hereafter.

Next, the flow proceeds to Step 915 where the CPU 81 obtains a cylinder fuel supply amount N strokes prior to the current point in time, Fc(k−N) by dividing a cylinder intake-air amount Mc(k−N), which is the intake-air amount of the cylinder in the intake-air step N strokes (N intake-air steps) prior to the current point in time, by the upstream control air/fuel ratio abyfs thus obtained. The value N is determined based upon the displacement of the internal combustion engine and the distance between the combustion chamber 25 and the air/fuel sensor 67.

The reason why the cylinder fuel supply amount N strokes prior to the current point in time Fc(k−N) is obtained by dividing the cylinder intake-air amount N strokes prior to the current point in time Mc(k−N) by the upstream control air/fuel ratio abyfs is that the movement of the mixture burned in the combustion chamber 25 up to the air/fuel ratio sensor 67 requires a period of time corresponding to N strokes. Note that the cylinder intake-air amount Mc is obtained for each air-intake step for each cylinder by executing the processing in Step 810 described above. The cylinder intake-air amount Mc thus obtained is stored in the RAM 83 in a form correlated with the corresponding air-intake step.

Then, the flow proceeds to Step 920 where the CPU 81 divides the cylinder intake-air amount N strokes prior to the current point in time Mc(k−N) by the target air/fuel ratio N strokes prior to the current point in time abyfr(k−N) (in this case, the theoretical air/fuel ratio), thereby obtaining the target cylinder fuel supply amount N strokes prior to the current point in time Fcr(k−N).

Then, the flow proceeds to Step 925 where the CPU 81 sets a cylinder fuel supply amount deviation DFc to a value obtained by subtracting the cylinder fuel supply amount Fc(k−N) from the target cylinder fuel supply amount Fcr(k−N). That is to say, the cylinder fuel supply amount deviation DFc represents the shortage of fuel supplied into the cylinder at the point in time before N strokes. Next, the flow proceeds to Step 930 where the CPU 81 obtains the air/fuel ratio feedback correction amount DFi using the following expression (3).

$$DFi = (Gp \cdot DFc + Gi \cdot SDFc) \cdot KFB \qquad (3)$$

In the above expression (3), Gp represents a predetermined proportional gain, and Gi represents a predetermined integration gain. While the coefficient KFB in expression (3) is preferably a variable corresponding to the engine revolution speed NE, the cylinder intake-air amount Mc, and so forth, with the present arrangement, the coefficient KFB is set to "1". On the other hand, the value SDFc is an integral value of the cylinder fuel supply amount deviation DFc, which is updated in the following step 935.

That is to say, in Step 935, the CPU 81 adds the cylinder fuel supply amount deviation DFc obtained in the aforementioned Step 925 to the integral value SDFc of the cylinder fuel supply amount deviation DFc at the current point in time, thereby obtaining a new integral value SDFc of the cylinder fuel supply amount deviation. Then, the flow proceeds to Step 995, whereby the present routine temporarily ends.

Thus, the air/fuel ratio feedback correction amount DFi is obtained by the proportional integral control. Furthermore, the fuel injection amount Fi is updated using the air/fuel ratio feedback correction amount DFi thus obtained, in the aforementioned Step 830 shown in FIG. 8. This compensates for the deviation of the fuel supply amount N strokes prior to the current point in time, whereby the average of the air/fuel ratio of the engine (accordingly, the air/fuel ratio of the gas flowing into the upstream catalysis 53) generally matches the target air/fuel ratio abyfr.

On the other hand, in a case that determination has been made in Step 905 that the air/fuel ratio feedback control condition is not satisfied, the CPU 81 makes a determination of "No" in the same Step 905, whereby the flow proceeds to Step 940. In Step 940, the air/fuel ratio feedback correction amount DFi is set to zero. Then, in the following Step 945, the integral value SDFc of the cylinder fuel supply amount deviation is initialized to zero. Note that the integral value SDFc thus initialized is used at the time when the air/fuel ratio feedback control is restarted. Subsequently, the flow proceeds to Step 995, whereby the present routine temporarily ends. As described above, in a case that the air/fuel ratio feedback control condition is not satisfied, the air/fuel ratio feedback control amount DFi is set to zero, and correction of the air/fuel ratio (basic fuel injection amount Fbase) is not performed.

Next, description will be made regarding the air/fuel ratio feedback control using the output Voxs of the oxygen concentration sensor 68. Note that the aforementioned control will also be referred to as "sub-feedback control". The aforementioned sub-feedback control amount vafsfb is calculated by the sub-feedback control.

Figure 10:
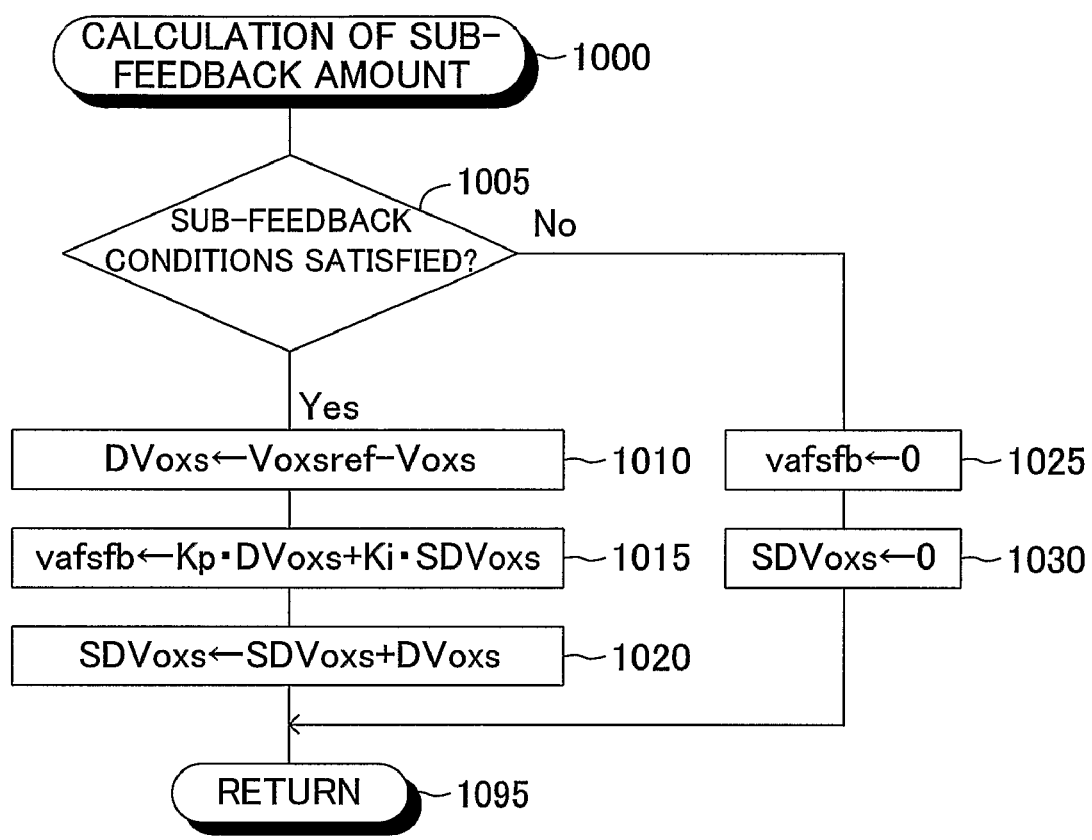
FIG. 10 is a flowchart which shows a routine executed by the CPU shown in FIG. 1, for calculating a sub-feedback amount.
Figure 11:
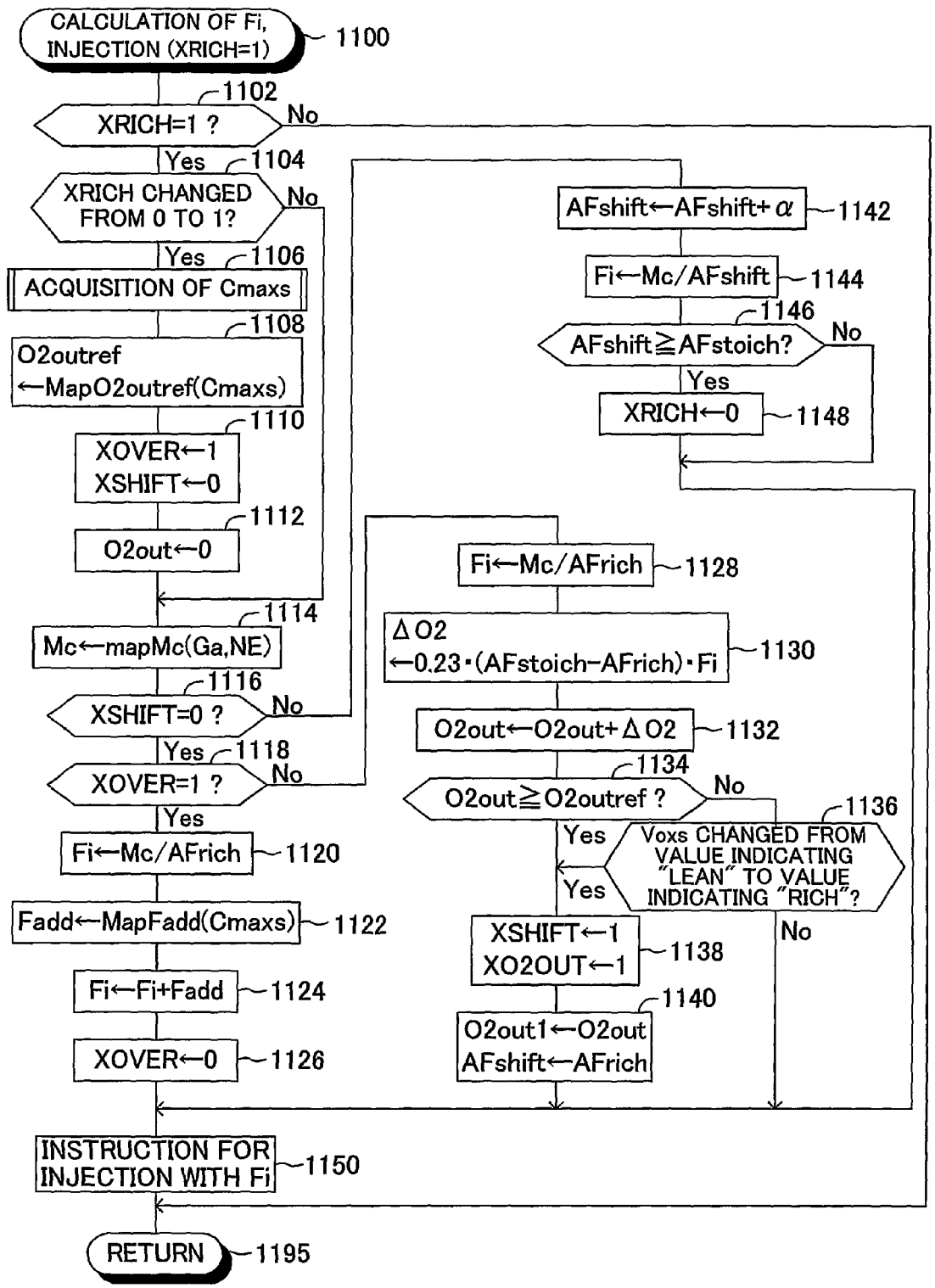
FIG. 11 is a flowchart which shows a routine executed by the CPU shown in FIG. 1, for performing fuel injection control during the period of time that the rich air/fuel ratio control after F/C is performed.

In order to obtain the sub-feedback control amount vafsfb, the CPU 81 executes the routine shown in FIG. 10 at regular intervals. Accordingly, the CPU 81 starts the processing from Step 1000 at the regular intervals. Then, the flow proceeds to Step 1005 where determination is made whether or not the sub-feedback control conditions are satisfied. Note that the sub-feedback control conditions are satisfied in a case that: the aforementioned air/fuel ratio feedback control conditions have been satisfied in Step 905; the cooling water temperature THW of the engine is equal to or greater than a predetermined second temperature which is greater than the aforementioned predetermined first temperature; and the oxygen concentration sensor 68 is in the normal state, for example.

Now, let us say that the sub-feedback control conditions are satisfied. In this case, the flow proceeds to Step 1005 where the CPU 81 makes a determination of "Yes", whereby the flow proceeds to Step 1010 where the CPU 81 subtracts the output Voxs of the oxygen concentration sensor 68 at the current point in time, from the target value Voxsref corresponding to the theoretical air/fuel ratio, thereby obtaining the output deviation amount DVoxs. Next, the flow proceeds to Step 1015 where the sub-feedback control amount vafsfb is calculated using the following expression (4).

$$vafsfb = Kp \cdot DVoxs + Ki \cdot SDVoxs \quad (4)$$

In the above expression (4), Kp represent a predetermined proportional gain, and Ki represents a predetermined integral gain. On the other hand, SDVoxs represents the integral value of the output deviation amount DVoxs, which is updated in the following Step 1020. That is to say, in Step 1020, the CPU 81 adds the output deviation amount DVoxs obtained in the above Step 1010 to the integral value SDVoxs of the output deviation amount at the current point in time, thereby obtaining a new integral value SDVoxs of the output deviation amount. Subsequently, the flow proceeds to Step 1095, whereby the present routine temporarily ends.

Thus, the sub-feedback control amount vafsfb is obtained. This value thus obtained is added to the actual output of the air/fuel ratio sensor 67 in the aforementioned Step 910 shown in FIG. 9, and the sum (vabyfs+vafsfb) is converted into the aforementioned upstream control air/fuel ratio abyfs based upon the map shown in FIG. 2. In other words, the upstream control air/fuel ratio abyfs is obtained as an air/fuel ratio which is different from the measured air/fuel ratio detected by the air/fuel ratio sensor 67 by a value corresponding to the sub-feedback control amount vafsfb obtained based upon the output Voxs of the oxygen concentration sensor 68.

Figure 9:
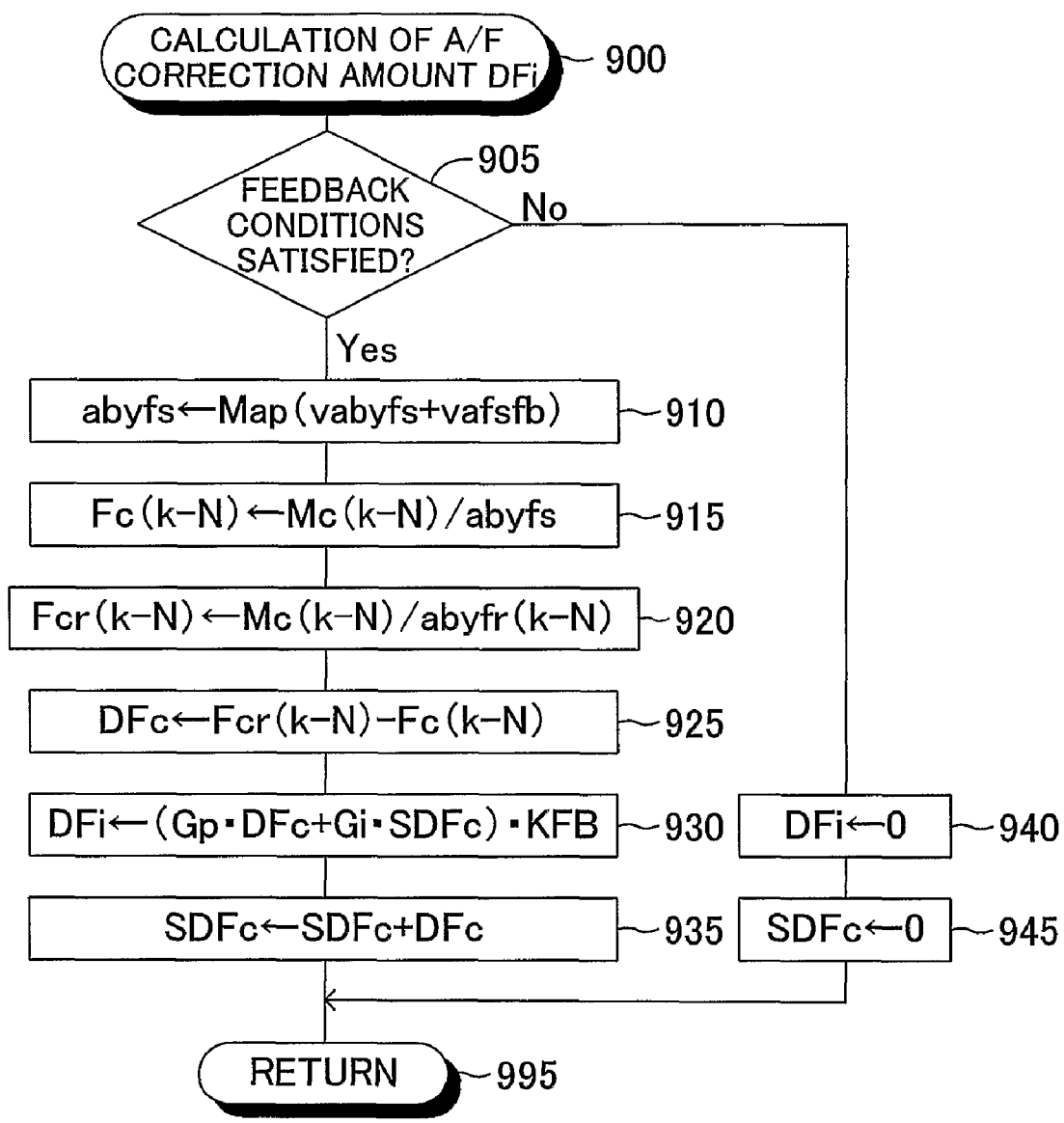
FIG. 9 is a flowchart which shows a routine executed by the CPU shown in FIG. 1, for calculating an air/fuel ratio feedback correction amount.

As a result, the cylinder fuel supply amount Fc(k−N) calculated in the aforementioned Step 915 shown in FIG. 9 is adjusted corresponding to the output Voxs of the oxygen concentration sensor 68. Accordingly, the air/fuel ratio feedback correction amount DFi is adjusted corresponding to the output Voxs of the oxygen concentration sensor 68 in Steps 925 and 930. This controls the air/fuel, ratio of the engine such that the air/fuel ratio on the downstream side of the upstream catalyst 53 matches the theoretical air/fuel ratio.

On the other hand, in a case that determination has been made in Step 1005 that the sub-feedback control condition is not satisfied, the CPU 81 makes a determination of "No" in this Step 1005, whereby the flow proceeds to Step 1025. In Step 1025, the sub-feedback control amount vafsfb is set to zero. Then, the flow proceeds to Step 1030 where the integral value SDVoxs is initialized to zero. Note that the integral value SDVoxs thus initialized is used at the time when the sub-feedback control is restarted. Subsequently, the flow proceeds to Step 1095 where the present routine temporarily ends. As described above, in a case that the sub-feedback control condition is not satisfied, the sub-feedback control amount vafsfb is set to zero, whereby the correction of the output vabyfs of the air/fuel ratio sensor 67 (accordingly, correction of the air/fuel ratio feedback correction amount DFi) is not performed corresponding to the output Voxs of the oxygen concentration sensor 68. The above is the description regarding a case that F/C and the rich air/fuel ratio control after F/C are not executed, and accordingly, a case in which the air/fuel ratio feedback control is executed (e.g., see the operation before the point in time t1 shown in FIG. 4).

Next, description will be made regarding a case in which F/C is started in this state (see the operation at the point in time t1 in FIG. 4). In this case, the air/fuel ratio feedback control condition and the sub-feedback control condition are not satisfied. Accordingly, the CPU 81 makes a determination of "No" in Step 905 shown in FIG. 9, and in Step 1005 shown in FIG. 10. As a result, the air/fuel ratio feedback correction amount DFi of zero is maintained (Step 940), whereby the air/fuel feedback control is stopped.

The CPU 81 repeatedly executes the routine shown in FIG. 8. Accordingly, in this case, the CPU 81 makes a determination of "Yes" in Step 815. Accordingly, the flow directly proceeds to Step 895, whereby the present routine temporarily ends. As a result, the processing in Step 835 is not executed, and accordingly, fuel injection is not performed (i.e., F/C is executed). Subsequently, the CPU 81 repeatedly makes a determination of "Yes" in Step 815 over the duration of F/C.

Upon completion of F/C after the elapse of a predetermined period of time (see the point in time t2 shown in FIG. 4), the CPU 81 makes a determination of "No" in Step 815, whereby the flow proceeds to Step 820. Such a determination is made at the point in time immediately after the end of F/C. Accordingly, the CPU 81 makes a determination of "Yes" in Step 820. Then, the flow proceeds to Step 840 where the rich air/fuel ratio control execution flag XRICH is switched from "0" to "1".

Accordingly, after the aforementioned processing, the CPU 81 makes a determination of "No" in Step 805, whereby the flow directly proceeds to Step 895. Accordingly, in a case of the rich air/fuel ratio control execution flag XRICH of "1" (i.e., in a case that the rich air/fuel ratio control after F/C is to be executed), the fuel injection control is not executed by the present routine. In this case, the fuel injection control is executed by a routine for calculating the fuel injection amount Fi and requesting fuel injection during the rich air/fuel ratio control after F/C shown in FIG. 11 described later.

That is to say, the CPU 81 repeatedly executes the routine shown in FIG. 11 every time that the crank angle of a predetermined cylinder becomes a predetermined crank angle (e.g., BTDC90°CA) before the top dead center of the cylinder, synchronously with the routine shown in FIG. 8. Thus, upon the crank angle of the predetermined cylinder becoming the aforementioned predetermined crank angle, the CPU 81 starts the processing from Step 1100, and the flow proceeds to Step 1102 where determination is made whether or not the rich air/fuel ratio control execution flag XRICH matches "1".

In a case that the CPU 81 makes a determination of "No", the flow directly proceeds to Step 1195 where the present routine temporarily ends.

Let us say that, in this stage, the rich air/fuel ratio control execution flag XRICH has just been switched from "0" to "1" by the processing in the upstream Step 840 (see the point in time t2 in FIG. 4). In this case, the CPU makes a determination of "Yes" in Step 1102, whereby the flow proceeds to Step 1104. In Step 1104, determination is made whether or not the rich air/fuel ratio control execution flag XRICH has been switched from "0" to "1".

The current point in time is immediately after the rich air/fuel ratio control execution flag XRICH has been switched from "0" to "1". Accordingly, the CPU 81 makes a determination of "Yes" in Step 1104, and executes a routine for determining the control maximum oxygen adsorption amount Cmaxs shown in FIG. 12, through the Step 1106. The control maximum oxygen adsorption amount Cmax is a value of the maximum oxygen adsorption amount of the upstream catalysis 53 which is used for calculating the request reducing amount O2outref and an asynchronous increment Fadd described later.

The CPU 81 starts the processing from Step 1200. Upon the flow proceeding Step 1205, the CPU 81 determines whether or not the maximum oxygen adsorption amount Cmax of the upstream catalysis 53 has been measured. Now, description will be made regarding the measurement of the maximum oxygen adsorption amount Cmax. The present device measures the maximum oxygen adsorption amount Cmax of the upstream catalysis 53 every time that a predetermined maximum oxygen adsorption amount measurement condition has been satisfied. In this measurement, the present device switches the air/fuel ratio of the engine from the lean air/fuel ratio to a predetermined rich air/fuel ratio without any feedback. Then, the present device measures the maximum oxygen adsorption amount Cmax of the upstream catalysis 53 based upon change in the output of the oxygen concentration sensor 68 provided downstream of the upstream catalysis 53.

More specifically, first, the present device adjusts the air/fuel ratio of the engine to a lean air/fuel ratio, whereby the oxygen adsorption amount of the upstream catalysis 53 becomes the maximum oxygen adsorption amount (accordingly, in this case, the oxygen concentration sensor 68 outputs a value indicating a lean air/fuel ratio (the aforementioned value min)). Subsequently, the present device switches the air/fuel ratio of the engine to a predetermined rich air/fuel ratio. Then, the present device integrates and updates the released O2 amount O2out with zero as the initial value using expressions corresponding to the aforementioned expressions (1) and (2). The present device performs this measurement until the point in time that the oxygen concentration sensor 68 provided downstream of the upstream catalysis 53 outputs a value corresponding to a rich air/fuel ratio (the aforementioned value max) due to reduction in the oxygen adsorption amount of the upstream catalysis to zero. Here, in this stage, the released O2 amount O2out thus updated matches the maximum oxygen adsorption amount of the upstream catalysis 53. Accordingly, in this stage, the present invention sets the maximum oxygen adsorption amount Cmax to the released O2 amount O2out thus updated, based upon the aforementioned fact. Note that the means for acquiring the maximum oxygen adsorption amount Cmax (oxygen adsorption capacity index value) corresponds to index-value acquisition means.

Determination is made that the aforementioned maximum oxygen adsorption amount Cmax of the upstream catalysis 53 has not been measured, during a period of time from the point in time that an unshown battery of the vehicle has been replaced, or that the ignition is turned from off to on, up to the point in time that the first measurement of the aforementioned maximum oxygen adsorption amount Cmax has been completed.

Let us say that the maximum oxygen adsorption amount Cmax has not been measured. Furthermore, the rich air/fuel ratio control after F/C has not been executed and completed after the point in time that the ignition has been turned on. In this case, in Step 1205, the CPU 81 makes a determination of "Yes", and the flow proceeds to Step 1210. In Step 1210, the CPU 81 determines whether or not the flag XO2OUT matches "0". Here, the flag XO2OUT of "1" represents that the rich air/fuel ratio control after F/C has been executed and completed after the point in time that the ignition has been turned on. On the other hand, the flag XO2OUT of "0" represents that the rich air/fuel ratio control after F/C has not been executed and completed after the point in time that the ignition is turned on.

In this stage, the rich air/fuel ratio control after F/C has not been executed and completed after the point in time that the ignition has been turned on, and accordingly, the value of the flag XO2OUT is "0". Accordingly, in Step 1210, the CPU 81 makes a determination of "Yes", and the flow proceeds to Step 1215. In Step 1215, the CPU 81 sets the control maximum oxygen adsorption amount Cmaxs to the maximum oxygen adsorption amount initial value Cmaxini.

With the present example, the maximum oxygen adsorption amount initial value Cmaxini is a median of the maximum oxygen adsorption amount of a new upstream catalysis 53 and that of a deteriorated upstream catalysis 53. The reason why the maximum oxygen adsorption amount initial value Cmaxini is set to such a value is as follows.

That is to say, let us consider an arrangement in which the maximum oxygen adsorption amount initial value Cmaxini is set to the maximum oxygen adsorption amount of the new upstream catalysis 53. With such an arrangement, the aforementioned asynchronous increment Fadd is generally set to an excessive value (see FIG. 6). Here, let us say that the upstream catalysis 53 has deteriorated to a considerable degree. In this case, with such an arrangement, the upstream catalysis 53 cannot perform detoxification of an unintended and great amount of unburned HC and CO flowing thereinto, leading to a risk that a great amount of unburned HC and CO would flow out from the upstream catalysis 53. On the other hand, let us consider an arrangement in which the maximum oxygen adsorption amount initial value Cmaxini is set to the maximum oxygen adsorption amount of the deteriorated upstream catalysis 53. With such an arrangement, the aforementioned asynchronous increment Fadd is generally set to an insufficient value (see FIG. 6). Here, let us say that the upstream catalysis 53 is a new one. In this case, such an arrangement has a difficulty in obtaining the sufficient reducing region in the upstream catalysis 53 in an extremely short period of time immediately after the end of F/C. This leads to a risk that a large amount of NOx would flow out from the upstream catalysis 53 during the extremely short period of time immediately after the end of F/C. Accordingly, with the present example, the maximum oxygen adsorption amount initial value Cmaxini is set to a median of the maximum oxygen adsorption amount of the new upstream catalysis 53 and that of the deteriorated upstream catalysis 53.

Then, the CPU 81 sets the control maximum oxygen adsorption amount Cmax to the maximum oxygen adsorption amount initial value Cmaxini, following which the flow proceeds to Step 1108 shown in FIG. 11 through Step 1295. In Step 1295, the CPU 81 determines the request reducing amount O2outref based upon the aforementioned control maximum oxygen adsorption amount Cmax thus set, and the table shown in FIG. 7. In this stage, the request reducing amount O2out is set to a value corresponding to the maximum oxygen adsorption amount initial value Cmaxini.

Subsequently, the flow proceeds to Step 1110 where the CPU 81 sets an over-rich flag XOVER to "1", as well as setting an air/fuel ratio transition flag XSHIFT to "0". In the following Step 1112, the CPU 81 initializes the value of the released O2 amount O2out to zero. Here, the over-rich flag XOVER of "1" represents that fuel injection is being performed at the over-rich air/fuel ratio. On the other hand, the over-rich flag XOVER of "0" represents that fuel injection is not performed at the over-rich air/fuel ratio (in this case, fuel injection is executed at the aforementioned shallow rich air/fuel ratio AFrich). Also, the air/fuel ratio transition flag XSHIFT of "1" represents that the present device is in the air/fuel ratio transition state. On the other hand, the air/fuel ratio transition flag XSHIFT of "0" represents that the present device is not in the air/fuel ratio transition state.

Next, the flow proceeds to Step 1114 where the CPU 81 obtains the cylinder intake-air amount Mc in the same way as in the upstream Step 810. Then, in the following Step 1116, the CPU 81 determines whether or not the air/fuel transition flag XSHIFT matches "0".

In this stage, the value of the air/fuel transition flag XSHIFT is "0". Accordingly, in Step 1116, the CPU 81 makes a determination of "Yes", and the flow proceeds to Step 1118. In Step 1118, the CPU 81 determines whether or not the over-rich flag XOVER matches "1". In this stage, the CPU 81 also makes a determination of "Yes", and the flow proceeds to Step 1120. Then, in Step 1120, the CPU 81 divides the cylinder intake-air amount Mc thus obtained, by the aforementioned shallow rich air/fuel ratio AFrich, thereby obtaining the fuel injection amount Fi for adjusting the air/fuel ratio of the engine to the shallow rich air/fuel ratio AFrich (second rich air/fuel ratio).

Next, the flow proceeds to Step 1122 where the CPU 81 obtains the asynchronous increment Fadd based upon the aforementioned control maximum oxygen adsorption amount Cmaxs thus obtained, and the table shown in FIG. 6. Thus, in this stage, the asynchronous increment Fadd is set to a value corresponding to the maximum oxygen adsorption amount initial value Cmaxini.

Then, the flow proceeds to Step 1124 where the CPU 81 sets the fuel injection value Fi to the sum of the aforementioned Fi thus obtained and the aforementioned asynchronous increment Fadd thus obtained. Thus, the fuel injection amount Fi is set to a value for adjusting the air/fuel ratio of the engine to the over-rich air/fuel ratio (first rich air/fuel ratio).

Subsequently, the flow proceeds to Step 1126 where the CPU 81 switches the over-rich flag XOVER from "1" to "0". Then, in the following Step 1150, the CPU 81 instructs the injector 39 corresponding to the aforementioned predetermined cylinder to inject fuel of the fuel-injection amount Fi. Then, the flow proceeds to Step 1195, whereby the present routine temporarily ends. Thus, with the present embodiment, fuel of the fuel injection amount Fi is injected only once into the cylinder before air-intake step for adjusting the air/fuel ratio of the engine to the over-rich air/fuel ratio. Subsequently, the rich air/fuel ratio control after F/C is started and executed.

After the aforementioned processing, the over-rich flag XOVER is "0". Accordingly, after this stage, the CPU 81 executes the present routine with a determination of "Yes" in Step 1102, a determination of "No" in Step 1104, and a determination of "Yes" in Step 1116, whereby the flow proceeds to Step 1118. In this Step 1118, the CPU 81 makes a determination of "No", and the flow proceeds to Step 1128.

Upon the flow proceeding to Step 1128, the CPU 81 divides the cylinder intake-air amount Mc obtained in the upstream Step 1114, by the aforementioned shallow rich air/fuel ratio AFrich, thereby calculating the fuel injection amount Fi for adjusting the air/fuel ratio of the engine to the shallow rich air/fuel ratio AFrich (second rich air/fuel ratio). Next, the flow proceeds to Step 1130 where the CPU 81 calculates the oxygen adsorption decrement ΔO2 based upon the fuel injection amount Fi obtained in Step 1128 and the aforementioned expression (1). Then, in the following Step 1132, the CPU 81 updates the value of the released O2 amount O2out by summing up this value in this stage (this value is zero in this stage) and the aforementioned oxygen adsorption amount decrement ΔO2 thus obtained, using the aforementioned expression (2).

Subsequently, the flow proceeds to Step 1134 where the CPU 81 determines whether or not the aforementioned released O2 amount O2out thus updated is equal to or greater than the request reducing amount O2outref set in the upstream Step 1108. In this stage, the aforementioned released O2 amount O2out thus updated is sufficiently smaller than the request reducing amount O2outref. Accordingly, in this stage, in Step 1134, the CPU 81 makes a determination of "No", and the flow proceeds to Step 1136. In Step 1136, the CPU 81 determines whether or not the output Voxs of the oxygen concentration sensor 68 has changed from a value indicating a lean air/fuel ratio (the aforementioned value min) to a value indicating a rich air/fuel ratio (the aforementioned value max). Here, change in the output Voxs of the oxygen concentration sensor 68 from a value indicating the lean air/fuel ratio to a value indicating the rich air/fuel value means that the oxygen adsorption amount of the upstream catalysis 53 has becomes zero due to the rich air/fuel ratio control after F/C.

In this stage, fuel injection corresponding to the over-rich air/fuel ratio has just been completed (i.e., F/C has just been completed). Accordingly, the oxygen concentration sensor output Voxs is maintained within a range indicating a lean air/fuel ratio. Accordingly, in Step 1136, the CPU 81 makes a determination of "No", and the flow proceeds to Step 1150. Thus, fuel of the fuel injection amount Fi for adjusting the air/fuel ratio of the engine to the shallow rich air/fuel ratio AFrich is injected into the cylinder before the air-intake step.

Subsequently, the CPU 81 repeatedly executes the processing in Steps 1102 and 1104, Steps 1114 through 1118, steps 1128 through 1134, and Steps 1136 and 1150, as long as the released O2 amount O2out updated and increased for each execution of the processing in Step 1132 is less than the request reducing amount O2outref, and the output Voxs of the oxygen concentration sensor 68 is maintained within a range indicating a lean air/fuel ratio. Thus, fuel of the fuel injection amount Fi for adjusting the air/fuel ratio of the engine to the shallow rich air/fuel ratio AFrich is injected into the cylinder before the air-intake step.

Now, let us say that the released O2 amount O2out has become equal to or greater than the request reducing amount O2outref (see the operation at the point in time t3 shown in FIG. 4). Alternatively, let us say that the output Voxs of the oxygen concentration sensor 68 has changed from a value indicating a lean air/fuel ratio to a value indicating a rich air/fuel ratio. In this case, upon the flow proceeding to Step 1134, or upon the flow proceeding to Step 1136, the CPU 81 makes a determination of "Yes", and the flow proceeds to Step 1138. In Step 1138, the CPU 81 switches both the air/fuel ratio transition flag XSHIFT and the flag XO2OUT from "0"

to "1". Thus, the fuel injection control corresponding to the shallow rich air/fuel ratio AFrich ends.

Then, the flow proceeds to Step 1140 where the CPU 81 sets a final released O2 amount O2out1 to the released O2 amount O2out updated in this stage, and sets an air/fuel-ratio-transition-duration air/fuel ratio AFshift to the aforementioned shallow rich air/fuel ratio AFrich (i.e., initial value). Here, the final released O2 amount O2out1 is used for setting the control maximum oxygen adsorption amount Cmaxs (Step 1220) as described later.

In a case that the processing in Step 1140 is executed according to the determination that the released O2 amount O2out is equal to or greater than the request reducing amount O2outref, the final released O2 amount O2out1 is set to the request reducing amount O2outref.

On the other hand, in a case that the processing in Step 1140 is executed according to the determination that the output Voxs of the oxygen concentration sensor 68 has changed from a value indicating a lean air/fuel ratio to a value indicating a rich air/fuel ratio (i.e., in a case that the oxygen adsorption amount of the upstream catalysis 53 has become zero), the final released O2 amount O2out1 is set to a value smaller than the request reducing amount O2outref. The final released O2 amount O2out1 thus obtained approximates the maximum oxygen adsorption amount Cmax of the upstream catalysis 53 with high precision.

In other words, the maximum oxygen adsorption amount Cmax has been set to a value greater than the actual maximum oxygen adsorption amount Cmax of the upstream catalysis 53 (i.e., in a case that the request reducing amount O2outref has been set to a value greater than the actual value), the final released O2 amount O2out1 approximates the maximum oxygen adsorption amount Cmax of the upstream catalysis 53 with high precision.

Subsequently, the air/fuel ratio transition flag XSHIFT is maintained at "1", and accordingly, the flow proceeds to Step 1116 through Steps 1102, 1104, and 1114. In Step 1116, the CPU 81 makes a determination of "No", and the flow proceeds to Step 1142. Thus, the aforementioned air/fuel ratio transition step is started.

Upon the flow proceeding to Step 1142, the CPU 81 updates the air/fuel-ratio-transition-duration air/fuel ratio AFshift to the sum of this value in this stage (the shallow rich air/fuel ratio AFrich, in this stage) and a predetermined positive small value α. Then, in the following Step 1144, the CPU 81 divides the cylinder intake-air amount Mc obtained in the upstream Step 1114 by the aforementioned air/fuel-ratio-transition-duration air/fuel ratio AFshift thus updated, thereby obtaining the fuel injection amount Fi for adjusting the air/fuel ratio of the engine to the air/fuel-ratio-transition-duration air/fuel ratio AFshift.

Subsequently, the flow proceeds to Step 1146 where the CPU 81 determines whether or not the aforementioned air/fuel-ratio-transition-duration air/fuel ratio AFshift thus updated has become equal to or greater than the theoretical air/fuel ratio AFstoich (i.e., whether or not the air/fuel ratio transition step is to be completed). In this stage, the air/fuel-ratio-transition-duration air/fuel ratio AFshift is set to a value near the shallow rich air/fuel ratio AFrich (accordingly, is smaller than AFstoich). Accordingly, the CPU 81 makes a determination of "No" in Step 1146, and the flow proceeds to Step 1150. Thus, fuel of the fuel injection amount Fi for adjusting the air/fuel ratio of the engine to the air/fuel-ratio-transition-duration air/fuel ratio AFshift is injected into the cylinder before the air-intake step.

Subsequently, the CPU 81 repeatedly executes the processing in Steps 1104, 1114, 1116, Steps 1142 through 1146, and Step 1150, until the air/fuel-ratio-transition-duration air/fuel ratio AFshift thus updated and increased by the processing in Step 1142 has become equal to or greater than the theoretical air/fuel ratio AFstoich. This allows the air/fuel ratio of the engine to be gradually adjusted from the shallow rich air/fuel ratio AFrich to the theoretical air/fuel ratio AFstoich.

Then, in a case that the air/fuel-ratio-transition-duration air/fuel ratio AFshift has become equal to or greater than the theoretical air/fuel ratio AFstoich (see the operation at the point in time t4 shown in FIG. 4), the CPU 81 makes a determination of "Yes" in Step 1146, and the flow proceeds to Step 1148. In Step 1148, the CPU 81 switches the rich air/fuel ratio execution flag XRICH from "1" to "0".

Accordingly, after the aforementioned processing, upon the flow proceeding to Step 1102, the CPU 81 makes a determination of "No", and the flow directly proceeds to Step 1195, whereby the present routine temporarily ends. Thus, the rich air/fuel ratio control after F/C ends. In addition, the CPU 81 also executes the routine shown in FIG. 8, synchronously with the routine shown in FIG. 11. Accordingly, upon the flow proceeding to Step 805, the CPU 81 makes a determination of "Yes", and restarts the processing in the following Steps 810 through 835.

Note that, in this stage, the aforementioned period of time TA has not elapsed from the end of the rich air/fuel ratio control after F/C. Accordingly, the air/fuel ratio feedback control condition is not satisfied. That is to say, the air/fuel ratio feedback correction amount DFi is maintained at "0" (Step 940). More specifically, the air/fuel feedback correction amount DFi, which is used in the processing in Step 830, is maintained at "0", and accordingly, the air/fuel ratio feedback control is kept stopped.

Then, after the aforementioned predetermined period of time TA has elapsed (see the operation at the point in time t5 in FIG. 4), the air/fuel ratio feedback control conditions are satisfied. As a result, the CPU 81 makes a determination of "Yes" in Step 905 shown in FIG. 9, and in Step 1005 shown in FIG. 10. Then, the CPU 81 sets the air/fuel ratio feedback correction amount DFi to a suitable value, thereby restarting the air/fuel ratio feedback control (Step 830).

The above is description regarding the operation in which F/C and the rich air/fuel ratio after F/C are executed in a case that the maximum oxygen adsorption amount Cmax has not been measured, and the rich air/fuel ratio control after F/C has not been executed and completed after the ignition has been turned on (XO2OUT=0) (i.e., in a case that the control maximum oxygen adsorption amount Cmaxs is set to the maximum oxygen adsorption amount initial value Cmaxini). Next, description will be made regarding the operation in which F/C and the rich air/fuel ratio after F/C are executed in a case that the measurement of the maximum oxygen adsorption amount Cmax remains uncompleted, and the rich air/fuel ratio control after F/C has been executed and completed after the ignition has been turned on (XO2OUT=1).

Figure 12:
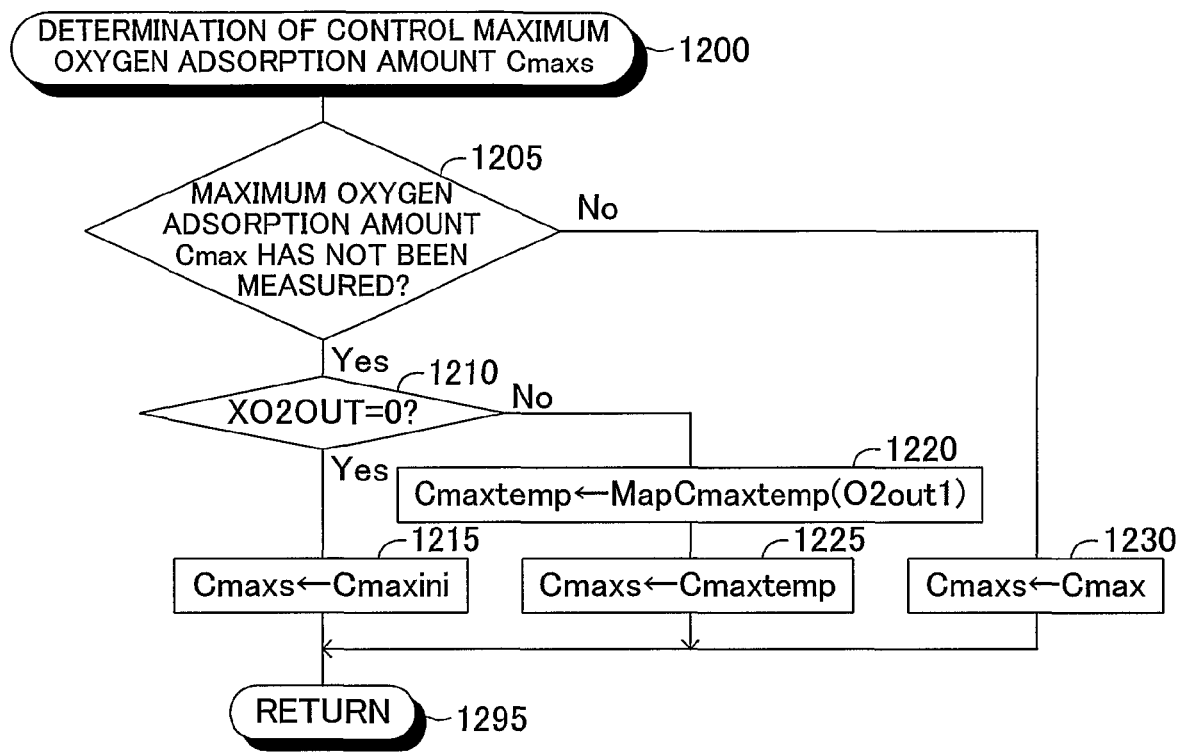
FIG. 12 is a flowchart which shows a routine executed by the CPU shown in FIG. 1, for determining a control maximum oxygen adsorption amount.

Let us say that the rich air/fuel ratio control after F/C has been started following the end of F/C (in a case that the flag XRICH is switched from "0" to "1" in Step 840) (see the operation in the point in time t2 in FIG. 4), the CPU 81 makes a determination of "Yes" both in Steps 1102 and 1104 shown in FIG. 11, and the flow proceeds to Step 1205 shown in FIG. 12 through Step 1106.

Figure 13:
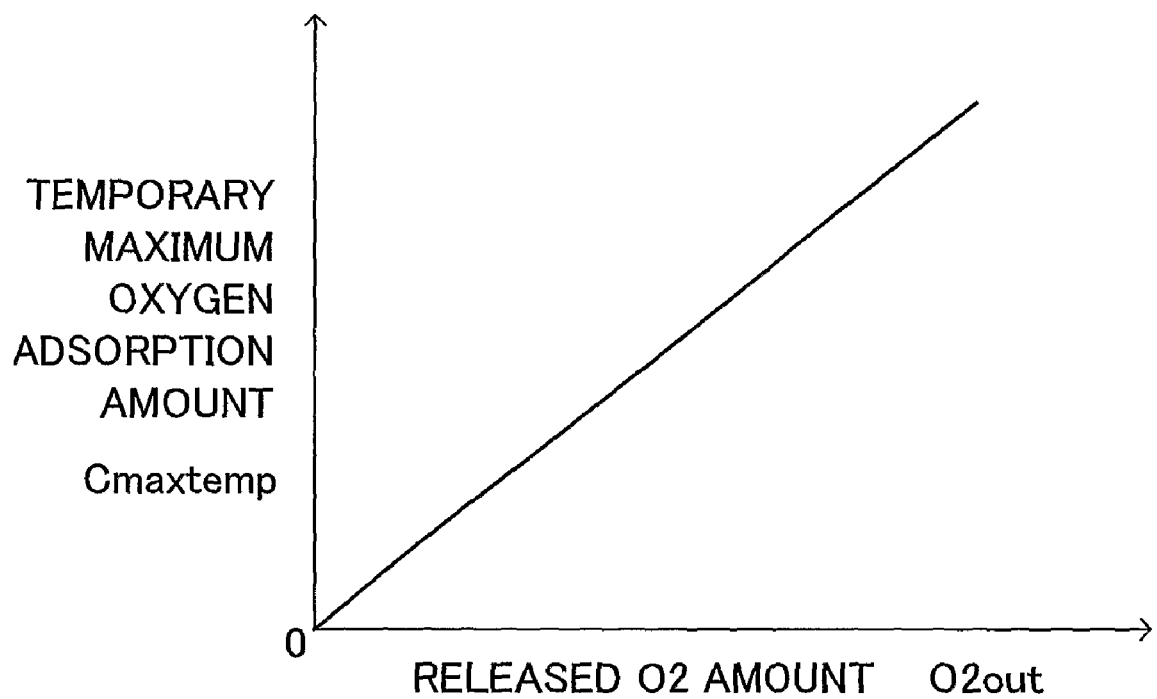
FIG. 13 is a chart which shows a table indicating the relation between a released O2 amount and a temporary maximum oxygen adsorption amount, which is referred by the CPU shown in FIG. 1.

Upon the flow proceeding to Step 1205, the CPU 81 makes a determination of "Yes", and the flow proceeds to Step 1210. In Step 1210, the CPU 81 makes a determination of "No", and the flow proceeds to Step 1220. In Step 1220, the CPU 81 obtains a temporary maximum oxygen adsorption amount Cmaxtemp based upon the latest final released O2 amount O2out1 updated in the upstream Step 1140 shown in FIG. 11, and a table MapCmaxtemp(O2out) which indicates the relation between the released O2 amount O2out shown in FIG. 13 and the temporary maximum oxygen adsorption amount Cmaxtemp. Thus, the temporary maximum oxygen adsorption amount Cmaxtemp is set to a value proportional to the final released O2 amount O2out1.

Then, the flow proceeds to Step 1225 where the CPU 81 sets the control maximum oxygen adsorption amount Cmax to the temporary maximum oxygen adsorption amount Cmaxtemp. Subsequently, the CPU 81 executes the processing in Step 1108 and the following Steps, through Step 1295.

Thus, the request reducing amount O2outref and the asynchronous increment Fadd are determined by the processing in Steps 1108 and 1122 based upon the aforementioned temporary maximum oxygen adsorption amount Cmaxtemp and the tables shown in FIGS. 7 and 6, respectively.

As a result, the CPU 81 obtains the temporary maximum oxygen adsorption amount Cmaxtemp closer to the actual maximum oxygen adsorption amount Cmax than the aforementioned maximum oxygen adsorption amount initial value Cmaxini even in a case that the processing in Step 1140 is executed according to a determination that the output Voxs of the oxygen concentration sensor 68 has changed from a value indicating a lean air/fuel ratio to a value indicating a rich air/fuel ratio (i.e., even in a case that the oxygen adsorption amount of the upstream catalysis 53 has become zero). Accordingly, even in such a case, the CPU 81 can obtain the control maximum oxygen adsorption amount Cmaxs approximating the actual maximum oxygen adsorption amount Cmax of the upstream catalysis with higher precision. Thus, the rich air/fuel ratio control is executed with the more suitable request reducing amount O2outref and asynchronous increment Fadd corresponding to the actual maximum oxygen adsorption amount Cmax.

The above is description regarding the operation in F/C and the rich air/fuel ratio after F/C are executed in a case that the measurement of the maximum oxygen adsorption amount Cmax remains uncompleted, and the rich air/fuel ratio control after F/C has been executed and completed after the ignition has been turned on (XO2OUT=1) (i.e., in a case that the control maximum oxygen adsorption amount Cmaxs is set to the temporary maximum oxygen adsorption amount Cmaxtemp). Next, description will be made regarding the operation in a case that the measurement of the maximum oxygen adsorption amount Cmax has been completed according to a determination that the aforementioned maximum oxygen adsorption amount measurement condition is satisfied.

Now, let us say that the rich air/fuel ratio control after F/C is started following F/C (accordingly, the flag XRICH is switched from "0" to "1" in Step 840) (see the operation at the point in time t2 in FIG. 4). In this case, the CPU 81 makes a determination of "Yes" both in Steps 1102 and 1104 shown in FIG. 11, and the flow proceeds to Step 1205 shown in FIG. 12 through Step 1106.

Upon the flow proceeding to Step 1205, the CPU 81 makes a determination of "No", and the flow proceeds to Step 1230. In Step 1230, the CPU 81 sets the control maximum oxygen adsorption amount Cmaxs to the aforementioned precise maximum oxygen adsorption amount Cmax thus measured. Subsequently, the CPU 81 executes the processing in Step 1108 and the following Steps, through Step 1295.

Thus, the request reducing amount O2outref and the asynchronous increment Fadd are determined by the processing in Steps 1108 and 1122 based upon the aforementioned precise maximum oxygen adsorption amount Cmax thus measured and the tables shown in FIGS. 7 and 6, respectively. This allows the rich air/fuel ratio control after F/C to be executed with the request reducing amount O2outref and the asynchronous increment Fadd precisely determined based upon the precise maximum oxygen adsorption amount Cmax of the upstream catalysis 53.

As described above, with the fuel injection control device according to the first embodiment of the present invention, the rich air/fuel ratio control after F/C is performed following F/C. With the rich air/fuel ratio control after F/C, fuel injection corresponding to the over-rich air/fuel ratio (a deep rich air/fuel ratio at which the operation for a long period of time leads to the driver experiencing lag sensation. air/fuel ratio of 11 is employed, for example.) is performed only once immediately after the end of F/C. Specifically, this fuel injection corresponding to the over-rich air/fuel ratio is performed using an amount of fuel which is the sum of the fuel amount corresponding to the shallow rich air/fuel ratio AFrich (the operation at this air/fuel ratio for a long period of time does not lead to the driver experiencing lag sensation. an air/fuel ratio of 13 is employed, for example.) and the predetermined asynchronous increment Fadd. Immediately after this fuel injection at an over-rich air/fuel ratio, fuel injection is performed using the fuel of the amount corresponding to the shallow rich air/fuel ratio AFrich. Thus, the air/fuel ratio of the engine is temporarily adjusted to the over-rich air/fuel ratio during an extremely short period of time. Then, immediately, the air/fuel ratio of the engine is adjusted to the shallow rich air/fuel ratio AFrich (i.e., the air/fuel ratio of the engine is adjusted in a two-stage manner).

Such an operation allows a sufficient area of the reducing region in the upstream catalysis 53 to be prepared in an extremely short period of time immediately after the end of F/C, thereby preventing a temporary increase of the $No_x$ discharge amount during the short period of time immediately after the end of F/C. Furthermore, with the present embodiment, the engine is operated at the over-rich air/fuel ratio during an extremely short period of time, thereby suppressing the driver experiencing lag sensation.

Furthermore, with the present embodiment, the greater the maximum oxygen adsorption amount Cmax of the upstream catalysis 53 is, the greater the aforementioned asynchronous increment Fadd, which is to be set, is. This enables a sufficient area of the reducing region in the upstream catalysis 53 to be prepared in an extremely short period of time immediately after the end of F/C in a stable manner, regardless of the degree of deterioration in the upstream catalysis 53. Thus, this prevents the aforementioned temporary increase in the $No_x$ discharge amount during such a short period of time.

Furthermore, with the present embodiment, in a stage where the maximum oxygen adsorption amount Cmax of the upstream catalysis 53 has not been measured, the asynchronous increment Fadd and so forth are determined using values (maximum oxygen adsorption amount initial value Cmaxini, temporary maximum oxygen adsorption amount Cmaxtemp) suitable for the maximum oxygen adsorption amount of the upstream catalysis 53. Thus, the present embodiment has the advantage of preventing the aforementioned temporary increase in the $NO_x$ discharge amount during such an extremely short period of time immediately after the end of F/C in a stable manner even in such a stage where the maximum oxygen adsorption amount Cmax of the upstream catalysis 53 has not been measured.

Second Embodiment

Next, description will be made regarding a fuel injection control device according to a second embodiment of the present invention. The fuel injection control device according to the present embodiment has the same configuration as that according to the first embodiment, except for the differences as follows. First, with the present embodiment, fuel injection corresponding to the over-rich air/fuel ratio (first rich air/fuel ratio) is performed multiple times (Nref times). Second, with the present embodiment, the target value AFoverrich is employed for the over-rich air/fuel ratio. Accordingly, description will be made below principally regarding these differences.

With the aforementioned first embodiment, the over-rich air/fuel ratio control in the engine is designed in order to reduce the period of time thereof as much as possible with the highest priority. Accordingly, with the aforementioned first embodiment, fuel injection corresponding to the over-rich air/fuel ratio is performed only once. However, in order to prepare a sufficient area of the reducing region in the upstream catalysis 53 in an extremely short period of time immediately after F/C, such only one-time fuel injection requires a considerable amount of fuel (i.e., the aforementioned asynchronous increment Fadd). In some cases, this increases the risk of accidental fire due to such one-time fuel injection.

In view of the problem described above, the fuel injection control device according to the second embodiment is designed in order to reduce the risk of such accidental fire as much as possible with the highest priority. Specifically, the fuel injection control device according to the second embodiment is designed so as to perform fuel injection multiple times (Nref times) corresponding to an over-rich air/fuel ratio during a sufficiently short period of time, which does not lead to the driver experiencing the lag sensation, immediately after the end of F/C. Here, the over-rich air/fuel ratio employed in the present embodiment is leaner than that employed in the first embodiment. This reduces the fuel amount for each fuel injection, thereby preventing accidental fire during the fuel injection corresponding to the over-rich air/fuel ratio.

Figure 14:
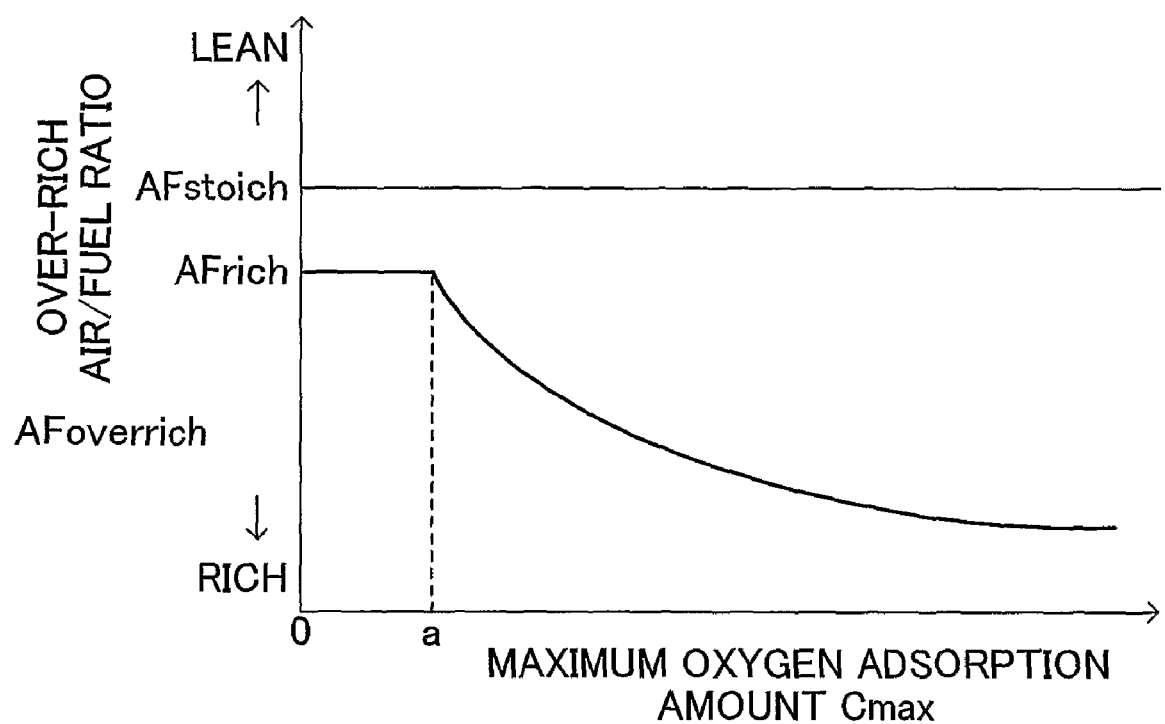
FIG. 14 is a chart which shows a table indicating the relation between the maximum oxygen adsorption amount of the upstream catalysis and the target value of the over-rich air/fuel ratio, which is referred by a CPU of a fuel injection control device according to a second embodiment of the present invention.

With the fuel injection control device according to the second embodiment, the target value of the over-rich air/fuel ratio, AFoverrich is determined based upon the control maximum oxygen adsorption amount Cmaxs of the upstream catalysis 53 and a table MapAFoverrich shown in FIG. 14 which indicates the relation between the aforementioned maximum oxygen adsorption amount Cmax of the upstream catalysis 53 and the target value of the over-rich air/fuel ratio, AFoverrich. Then, as described above, fuel injection is performed Nref times at the air/fuel ratio of the engine matching the target value of the over-rich air/fuel ratio, AFoverrich.

With such an arrangement, the greater the maximum oxygen adsorption amount Cmax of the upstream catalysis 53 is, the richer the target value AFoverrich of the over-rich air/fuel ratio is. This corresponds to the operation according to the aforementioned first embodiment performed such that the greater the maximum oxygen adsorption amount Cmax of the upstream catalysis 53 is, the greater the asynchronous increment Fadd is.

This enables a sufficient area of the reducing region to prepared in the upstream catalysis 53 in an extremely short period of time immediately after the end of F/C, regardless of the degree of deterioration in the upstream catalysis 53, in the same way as with the aforementioned first embodiment. Note that, in a case that the control maximum oxygen adsorption amount Cmaxs is equal to or smaller than the value a, the over-rich air/fuel ratio AFoverrich is maintained at the aforementioned shallow rich air/fuel ratio AFrich as shown in FIG. 14.

Actual Operation of the Second Embodiment

Description will be made regarding the actual operation of the fuel injection control device according to the second embodiment. With the fuel injection control device according to the present embodiment, the CPU 81 executes the routine shown in FIGS. 8 through 12 (except for the routine shown in FIG. 11) without change, in the same way as with the first embodiment. Furthermore, the CPU 81 of the present device executes the routine shown in the flowchart in FIG. 15 instead of the routine executed by the CPU 81 according to the first embodiment shown in FIG. 11. Description will be made below regarding the unique routine according to the second embodiment shown in FIG. 15.

Figure 15:
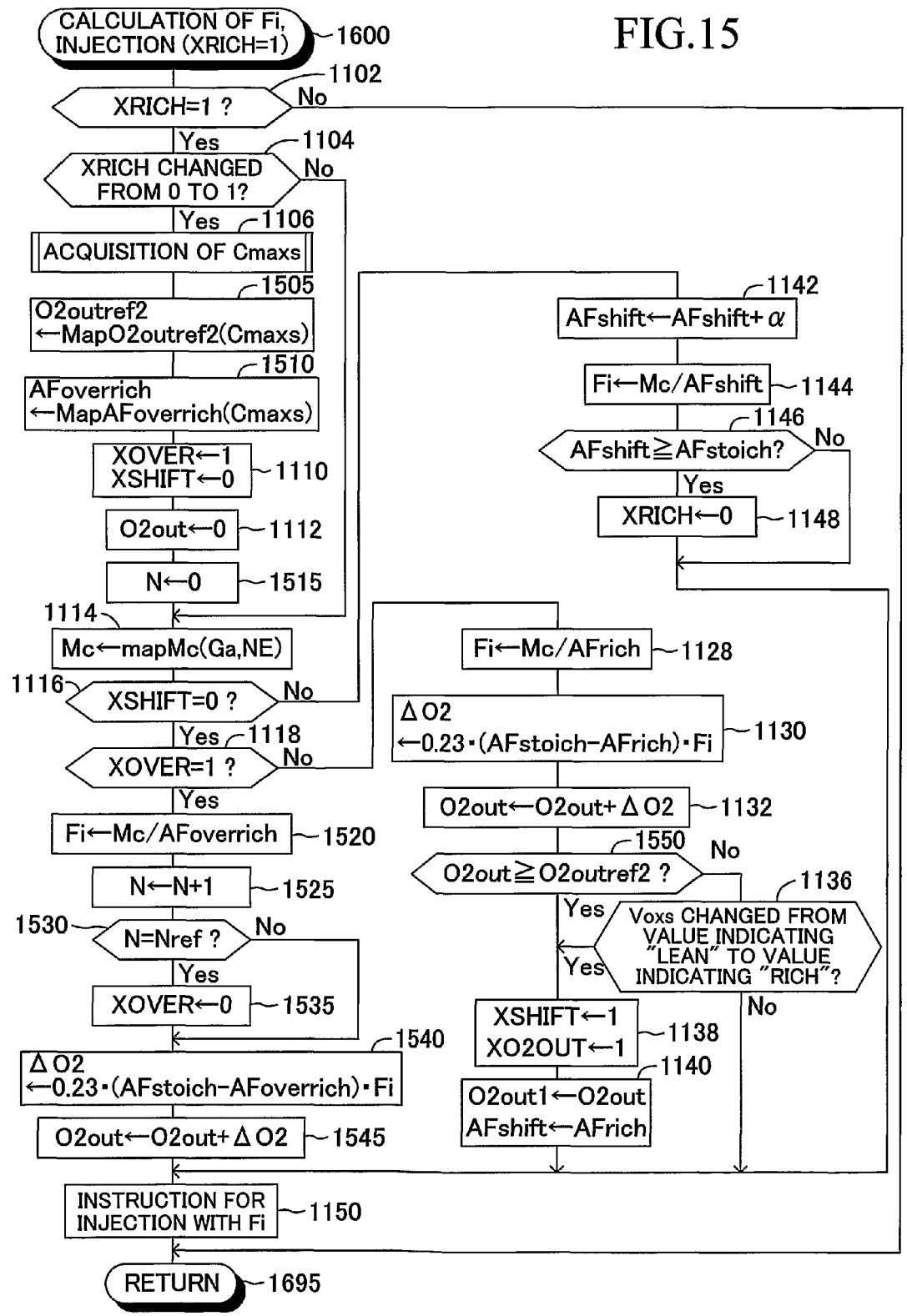
FIG. 15 is a flowchart which shows a routine executed by the CPU of the fuel injection control device according to the second embodiment of the present invention, for performing fuel injection control during the period of time that the rich air/fuel ratio control after F/C is performed.

The CPU 81 of the present device repeatedly executes a routine shown in FIG. 15 for calculating the fuel injection amount Fi and requesting fuel injection during the execution of the rich air/fuel ratio control after F/C, every time that the crank angle of a predetermined cylinder becomes a predetermined crank angle (e.g., BTDC90°CA) before the top dead center of the cylinder, synchronously with the routine shown in FIG. 8. Note that, in the routine shown in FIG. 15, the same Steps as those shown in FIG. 11 are denoted by the same reference numerals as those shown in FIG. 11.

Figure 16:
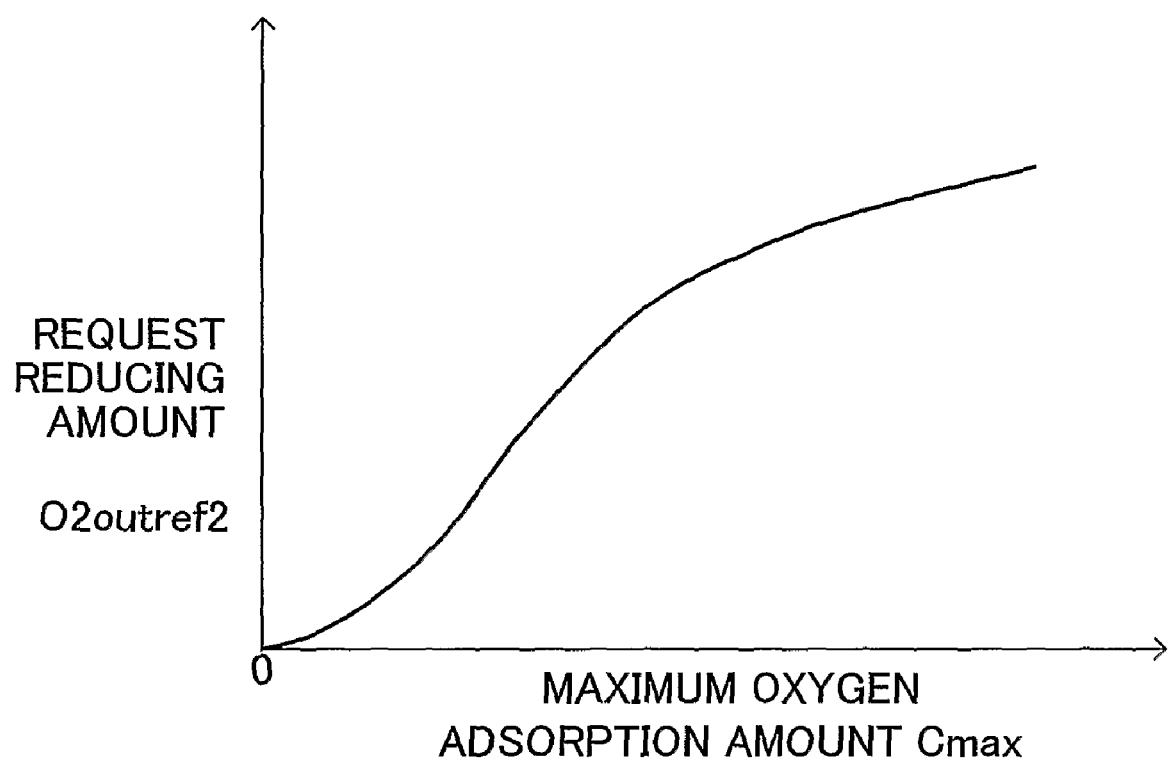
FIG. 16 is a chart which shows a table indicating the relation between the maximum oxygen adsorption amount of the upstream catalysis and the request reducing amount, which is referred by the CPU of the fuel injection control device according to the second embodiment of the present invention.
Figure 17:
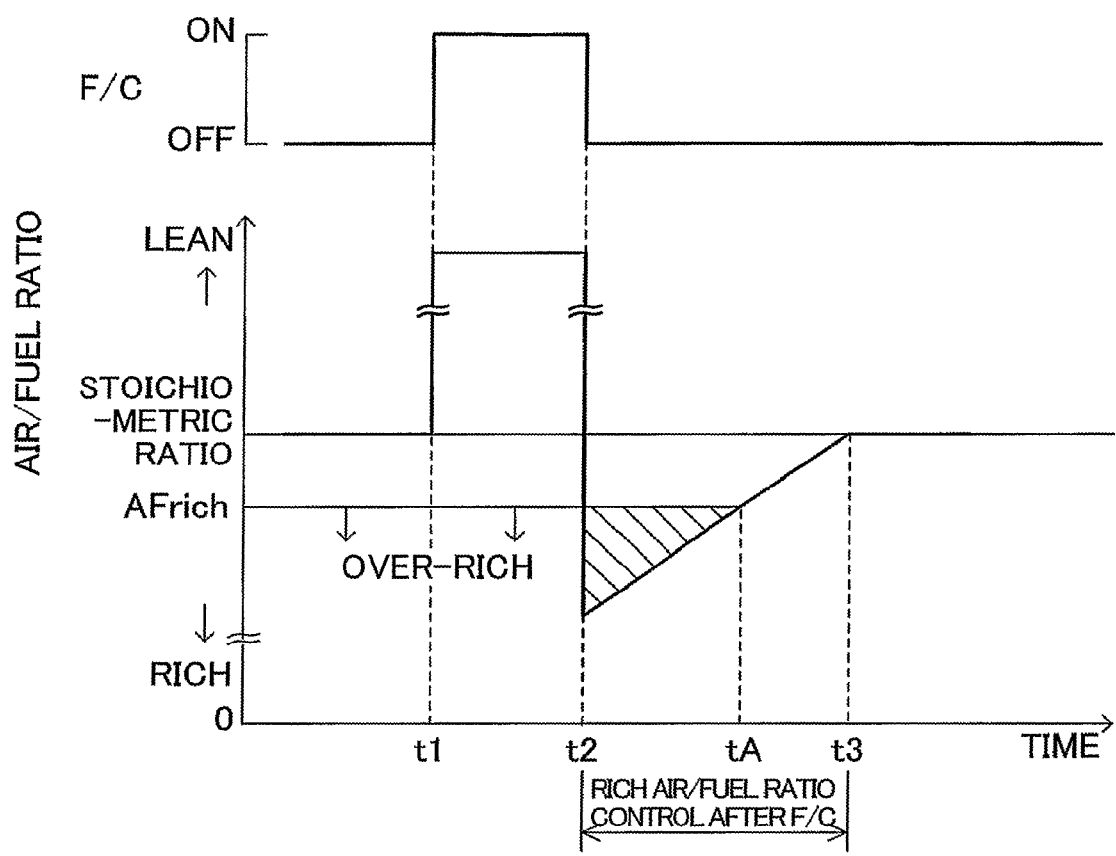
FIG. 17 is a timechart which shows change in the air/fuel ratio of the engine in a case that F/C and rich air/fuel ratio control after F/C are performed by a conventional fuel injection control device.

Now, let us say that the rich control execution flag XRICH has just been switched from "0" to "1" by the processing in the upstream Step 840 (see the operation at the point in time t2 shown in FIG. 4). In this case, the CPU makes a determination of "Yes" in Steps 1102 and 1104, and the flow proceeds to Step 1106. In Step 1106 (in reality, in the routine shown in FIG. 12), the CPU 81 acquires the control maximum oxygen adsorption amount Cmaxs, following which the flow proceeds to Step 1505. In Step 1505, the CPU 81 obtains the request reducing amount O2outref based upon a table MapO2outref2 which indicates the relation between the maximum oxygen adsorption amount Cmax of the upstream catalysis 53 and the request reducing amount O2outref2 shown in FIG. 16, and the aforementioned control maximum oxygen adsorption amount Cmax thus obtained.

Note that the request reducing amount O2outref2 is set to a value greater than the request reducing amount O2outref obtained in Step 1108 according to the first embodiment shown in FIG. 11, by the released O2 amount O2out due to the aforementioned Nref-times fuel injection corresponding to the over-rich air/fuel ratio.

Subsequently, the flow proceeds to Step 1510 where the CPU 81 obtains the target value AFoverrich of the over-rich air/fuel ratio based upon the table MapAFoverrich which indicates the maximum oxygen adsorption amount Cmax of the upstream catalysis 53 and the target value AFoverrich of the over-rich air/fuel ratio shown in FIG. 14, and the aforementioned control maximum oxygen adsorption amount Cmaxs thus obtained.

Next, the CPU 81 executes the processing in Steps 1110 and 1112 in order, following which the flow proceeds to Step 1515 where the CPU 81 initializes the value of a counter N to zero. Here, the counter N is a counter for counting the instances of fuel injection corresponding to the over-rich air/fuel ratio.

Next, the CPU 81 executes the processing in Step 1114, following which the CPU 81 makes a determination of "Yes" in Steps 1116 and 1118. Subsequently, the flow proceeds to Step 1520 where the CPU 81 divides the intake-air amount Mc obtained in Step 1114 by the target value AFoverrich of the over-rich air/fuel ratio obtained in the upstream Step 1510, thereby obtaining the fuel injection amount Fi for adjusting the air/fuel ratio of the engine to the aforementioned target value AFoverrich (first rich air/fuel ratio).

Next, the flow proceeds to Step 1525 where the CPU 81 increments the value of the counter N (the value is zero in this stage) by 1. Then, in the following Step 1530, the CPU 81 determines whether or not the value of the counter N matches the aforementioned Nref. The CPU 81 makes a determination of "No" in this Stage, and the flow proceeds to Steps 1540 and 1545 in that order. In these Steps, the CPU 81 updates the released O2 amount O2out with the initial value as "0" for each fuel injection based upon the fuel injection amount Fi corresponding to the over-rich air/fuel ratio obtained in Step 1520 in the same way as in Steps 1130 and 1132 shown in FIG. 11.

Then, the CPU 81 executes the processing in Step 1150. Thus, fuel of the fuel injection amount Fi for adjusting the air/fuel ratio of the engine to the over-rich air/fuel ratio is injected into the cylinder before the air-intake step. Subsequently, the CPU 81 repeatedly makes a determination of "No" in Step 1530 during the repeated execution of the present routine until the value of the counter N incremented by 1 in Step 1525 matches the value Nref, thereby repeatedly executing the processing in Steps 1540, 1545, and 1150.

Then, in a case that the value of the counter N has become the same as the value Nref, the CPU 81 makes a determination of "Yes" in Step 1530, and the flow proceeds to Step 1535 where the CPU 81 switches the over-rich flag XOVER from "1" to "0". Then, the CPU 81 executes the processing in Steps 1540, 1545, and 1150.

Subsequently, the Nref-rimes fuel injection corresponding to the over-rich air/fuel ratio ends. Note that the released O2 amount O2out in this stage matches the integrated value of the oxygen adsorption decrement ΔO2 due to the Nref-times fuel injection corresponding to the over-rich air/fuel ratio.

Subsequently, the over-rich flag XOVER is set to zero. Accordingly, the CPU 81 executes the processing in Steps 1128 through 1140, and Step 1150 (including Step 1550 instead of Step 1134). Thus, fuel injection corresponding to the aforementioned shallow rich air-fuel ratio AFrich is repeatedly executed. Furthermore, in Step 1132, the released O2 amount O2out is updated with the aforementioned "integrated value of the oxygen adsorption decrement amount ΔO2 due to Nref-times fuel injection" as the initial value.

Furthermore, in the present routine, in Step 1550, determination is made whether or not the aforementioned released O2 amount O2out thus updated in Step 1132 with the "integrated value of the oxygen adsorption decrement amount ΔO2 due to Nref-times fuel injection" as an increment is equal to or greater than the request reducing amount O2out ref2 set in the upstream Step 1505. In a case that the CPU 81 makes a determination of "Yes" either in Step 1550 or Step 1136, the aforementioned fuel injection corresponding to the shallow rich air/fuel ratio AFrich ends, and the aforementioned air/fuel ratio transition step is started.

As described above, with the fuel injection control device according to the second embodiment of the present invention, in order to prevent accidental fire with the highest priority, fuel injection corresponding to a leaner over-rich air/fuel ratio than that according to the first embodiment is performed multiple (Nref) times over a sufficiently short period of time which does not lead the driver experiencing lag sensation immediately after the end of F/C. This allows the fuel amount to be reduced for each fuel injection, thereby preventing accidental fire.

The present invention is not restricted to the embodiments described above. Rather, various changes and modifications of the aforementioned embodiments may be made without departing from the scope of the present invention. For example, description has been made in the first embodiment regarding an arrangement in which fuel injection (corresponding to the first rich air/fuel ratio) is performed only once with a fuel amount which is the sum of the fuel amount for adjusting the air/fuel ratio of the engine to the shallow rich air/fuel ratio AFrich (second rich air/fuel ratio) and the aforementioned asynchronous increment Fadd. Also, an arrangement may be made in which such fuel injection is performed multiple times (e.g., once for each cylinder, and accordingly, four times in total) over a sufficiently short period of time which does not lead to the driver experiencing lag sensation.

On the other hand, description has been made in the aforementioned second embodiment regarding an arrangement in which fuel injection corresponding to the over-rich air/fuel ratio is performed Nref times (which is a fixed value). Also, an arrangement may be made in which the aforementioned value Nref is adjusted such that the greater the maximum oxygen adsorption amount Cmax (oxygen adsorption capacity) of the upstream catalysis 53 is, the greater the value Nref is.

Also, description has been made in the aforementioned embodiments regarding an arrangement in which the maximum oxygen adsorption amount initial value Cmaxini is set to the median of the maximum oxygen adsorption amount of a new upstream catalysis 53 and a deteriorated one. Also, an arrangement may be made in which the maximum oxygen adsorption amount initial value Cmaxini is set to the maximum oxygen adsorption amount of the new upstream catalysis 53.

With such an arrangement, in Step where the control maximum oxygen adsorption amount Cmaxs is set to the maximum oxygen adsorption amount initial value Cmaxini (Step 1215), the control maximum oxygen adsorption amount Cmax is set to a greater value than the actual oxygen adsorption amount Cmax of the upstream catalysis 53 with high frequency (accordingly, the request reducing amount O2outref (or O2outref2) is set to a greater value than the actual value with high frequency). This allows the final released O2 amount O2out1 set in Step 1140 to more suitably approximate the maximum oxygen adsorption amount Cmax of the upstream catalysis 53 with high frequency.

Thus, with such an arrangement, in Step where the control maximum oxygen adsorption amount Cmaxs is set to the temporary maximum oxygen adsorption amount Cmaxtemp following execution of the rich air/fuel ratio control after F/C (Step 1225), the control maximum oxygen adsorption amount Cmaxs approximates the actual maximum oxygen adsorption amount Cmax of the upstream catalysis 53 with high precision. Thus, such an arrangement enables the rich air/fuel ratio control after F/C to be executed with the request reducing amount O2outref (O2outref2) and the asynchronous increment Fadd suitably determined corresponding to the actual maximum oxygen adsorption amount Cmax of the upstream catalysis 53.

Description has been made in the aforementioned embodiments regarding an arrangement in which the first rich air/fuel ratio (specifically, the asynchronous increment Fadd, the target value AFoverrich of the over-rich air/fuel ratio) is adjusted corresponding to the maximum oxygen adsorption amount Cmax of the upstream catalysis 53 alone. Also, an arrangement may be made in which the first rich air/fuel ratio is adjusted based upon the temperature of the upstream catalysis 53 (oxygen adsorption capacity index value) acquired by the catalysis temperature sensor 69, the cylinder intake-air amount Mc (exhaust flow speed, oxygen adsorption capacity index value), or the like, as well as the aforementioned maximum oxygen adsorption amount Cmax.

The invention claimed is:

1. A fuel injection control device for an internal-combustion engine which includes fuel injecting means for injecting fuel into a combustion chamber, and a catalysis provided to an exhaust path of said internal-combustion engine, said fuel injection control device comprising:

fuel cut processing executing means for performing fuel cut processing which is processing for inhibiting fuel injection from said fuel injection means corresponding to the operation state of said internal-combustion engine; and post-fuel-cut-processing rich air/fuel ratio control means for controlling the fuel amount injected from said fuel injecting means such that the air/fuel ratio of gas flowing into said catalysis is richer than the theoretical air/fuel ratio after said fuel cut processing, wherein said post-fuel-cut-processing rich air/fuel ratio control means adjusts the fuel amount injected from said fuel injecting means such that the air/fuel ratio of the gas flowing into said catalysis is adjusted to a first rich air/fuel ratio, which is a value less than 11, for a predetermined short period of time alone from the end of said fuel cut processing, following which said air/fuel ratio is switched to a second rich air/fuel ratio, which is a value equal to or greater than 11 and less than the theoretical air/fuel ratio, immediately after said short period of time.

2. A fuel injection control device for an internal-combustion engine according to claim 1, further including index-value acquisition means for acquiring an oxygen adsorption capacity index value which represents the degree of the oxygen adsorption capacity of said catalysis, wherein said post-fuel-cut-processing rich air/fuel ratio control means determines said first rich air/fuel ratio based upon said acquired oxygen adsorption capacity index value such that the greater the oxygen adsorption capacity of said catalysis is, the richer said first rich air/fuel ratio is.

3. A fuel injection control device for an internal-combustion engine according to claim 1, wherein said post-fuel-cut-processing rich air/fuel ratio control means adjusts the fuel amount injected from said fuel injecting means such that fuel injection corresponding to said first rich air/fuel ratio is performed only once.

4. A fuel injection control device for an internal-combustion engine according to claim 1, wherein said post-fuel-cut-processing rich air/fuel ratio control means adjusts the fuel amount injected from said fuel injecting means such that fuel injection corresponding to said first rich air/fuel ratio is performed multiple times.

5. A fuel injection control device for an internal-combustion engine according to claim 2, wherein said post-fuel-cut-processing rich air/fuel ratio control means adjusts the fuel amount injected from said fuel injecting means such that fuel injection corresponding to said first rich air/fuel ratio is performed only once.

6. A fuel injection control device for an internal-combustion engine according to claim 2, wherein said post-fuel-cut-processing rich air/fuel ratio control means adjusts the fuel amount injected from said fuel injecting means such that fuel injection corresponding to said first rich air/fuel ratio is performed multiple times.

* * * * *